United States Patent [19]
Alden et al.

[11] Patent Number: 6,101,543
[45] Date of Patent: Aug. 8, 2000

[54] PSEUDO NETWORK ADAPTER FOR FRAME CAPTURE, ENCAPSULATION AND ENCRYPTION

[75] Inventors: Kenneth F. Alden, Boylston, Mass.; Mitchell P. Lichtenberg, Sunnyvale; Edward P. Wobber, Menlo Park, both of Calif.

[73] Assignee: Digital Equipment Corporation, Maynard, Mass.

[21] Appl. No.: 08/738,155

[22] Filed: Oct. 25, 1996

[51] Int. Cl.[7] .............................. H04L 12/46; G06F 11/00
[52] U.S. Cl. ........................ 709/229; 709/225; 709/226; 709/227; 709/228; 709/236; 709/238; 709/239
[58] Field of Search ....................... 395/200.55, 200.56, 395/200.57, 200.58, 200.59, 200.66, 200.68, 200.69; 709/229, 225, 226, 227, 228, 236, 238, 239

[56] References Cited

PUBLICATIONS

1992, Feb. 4, Lampson, B., Abadi, M., Burrows, M., Wobber, Edward, *Authentication in Distributed Systems: Theory and Practice*, Digital Systems Research Center, Palo Alto, CA.
1994, Bruce Schneier, *Applied Cryptography*, pp. 139–153, pp. 176–178, John Wiley Sons Inc.
1994, Cheswick, W.R., Bellovin, S.M., *Firewalls and Internet Security*, pp. 119–124, 211–234, Copyright AT&T Bell Labs., Inc., Murray Hill, NJ.
Bellovin, S.M., *Pseudo–Network Drivers and Virtual Networks*, AT&T Bell Labs. Murray Hill, NJ.

*Primary Examiner*—Zarni Maung
*Assistant Examiner*—Saleh Najjar
*Attorney, Agent, or Firm*—Pennie & Edmonds LLP; David A. Dagg

[57] ABSTRACT

A new pseudo network adapter is disclosed providing an interface for capturing packets from a local communications protocol stack for transmission on the virtual private network. The system further includes a Dynamic Host Configuration Protocol (DHCP) server emulator, and an Address Resolution Protocol (ARP) server emulator. The new system indicates to the local communications protocol stack that nodes on a remote private network are reachable through a gateway that is in turn reachable through the pseudo network adapter. The new pseudo network adapter includes a transmit path for processing data packets from the local communications protocol stack for transmission through the pseudo network adapter. The transmit path includes an encryption engine for encrypting the data packets and an encapsulation engine for encapsulating the encrypted data packets into tunnel data frames. The pseudo network adapter passes the tunnel data frames back to the local communications protocol stack for transmission to a physical network adapter on a remote server node. The new pseudo network adapter further includes an interface into a transport layer of the local communications protocol stack for capturing received data packets from the remote server node, and a receive path for processing received data packets captured from the transport layer of the local communications protocol stack. The receive path includes a decapsulation engine, and a decryption engine, and passes the decrypted, decapsulated data packets back to the local communications protocol stack for delivery to a user.

22 Claims, 18 Drawing Sheets

PSEUDO NETWORK ADAPTER FOR FRAME CAPTURE, ENCAPSULATION AND ENCRYPTION

FIELD OF THE INVENTION

The invention relates generally to establishing secure virtual private networks. The invention relates specifically to a pseudo network adapter for capturing, encapsulating and encrypting messages or frames.

BACKGROUND

In data communications it is often required that secure communications be provided between users of network stations (also referred to as "network nodes") at different physical locations. Secure communications must potentially extend over public networks as well as through secure private networks. Secure private networks are protected by "firewalls", which separate the private network from a public network. Firewalls ordinarily provide some combination of packet filtering, circuit gateway, and application gateway technology, insulating the private network from unwanted communications with the public network.

One approach to providing secure communications is to form a virtual private network. In a virtual private network, secure communications are provided by encapsulating and encrypting messages. Encapsulated messaging in general is referred to as "tunneling". Tunnels using encryption may provide protected communications between users separated by a public network, or among a subset of users of a private network.

Encryption may for example be performed using an encryption algorithm using one or more encryption "keys". When an encryption key is used, the value of the key determines how the data is encrypted and decrypted. When a public-key encryption system is used, a key pair is associated with each communicating entity. The key pair consists of an encryption key and a decryption key. The two keys are formed such that it is unfeasible to generate one key from the other. Each entity makes its encryption key public, while keeping its decryption key secret. When sending a message to node A, for example, the transmitting entity uses the public key of node A to encrypt the message, and then the message can only be decrypted by node A using node A's private key.

In a symmetric key encryption system a single key is used as the basis for both encryption and decryption. An encryption key in a symmetric key encryption system is sometimes referred to as a "shared" key. For example, a pair of communicating nodes A and B could communicate securely as follows: a first shared key is used to encrypt data sent from node A to node B, while a second shared key is to be used to encrypt data sent from node B to node A. In such a system, the two shared keys must be known by both node A and node B. More examples of encryption algorithms and keyed encryption are disclosed in many textbooks, for example "Applied Cryptography—Protocols, Algorithms, and Source Code in C", by Bruce Schneier, published by John Wiley and Sons, New York, N.Y. copyright 1994.

Information regarding what encryption key or keys are to be used, and how they are to be used to encrypt data for a given secure communications session is referred to as "key exchange material". Key exchange material may for example determine what keys are used and a time duration for which each key is valid. Key exchange material for a pair of communicating stations must be known by both stations before encrypted data can be exchanged in a secure communications session. How key exchange material is made known to the communicating stations for a given secure communications session is referred to as "session key establishment".

A tunnel may be implemented using a virtual or "pseudo" network adapter that appears to the communications protocol stack as a physical device and which provides a virtual private network. A pseudo network adapter must have the capability to receive packets from the communications protocol stack, and to pass received packets back through the protocol stack either to a user or to be transmitted.

A tunnel endpoint is the point at which any encryption/decryption and encapsulation/decapsulation provided by a tunnel is performed. In existing systems, the tunnel end points are pre-determined network layer addresses. The source network layer address in a received message is used to determine the "credentials" of an entity requesting establishment of a tunnel connection. For example, a tunnel server uses the source network layer address to determine whether a requested tunnel connection is authorized. The source network layer address is also used to determine which cryptographic key or keys to use to decrypt received messages.

Existing tunneling technology is typically performed by encapsulating encrypted network layer packets (also referred to as "frames") at the network layer. Such systems provide "network layer within network layer" encapsulation of encrypted messages. Tunnels in existing systems are typically between firewall nodes which have statically allocated IP addresses. In such existing systems, the statically allocated IP address of the firewall is the address of a tunnel end point within the firewall. Existing systems fail to provide a tunnel which can perform authorization based for an entity which must dynamically allocate its network layer address. This is especially problematic for a user wishing to establish a tunnel in a mobile computing environment, and who requests a dynamically allocated IP address from an Internet Service Provider (ISP).

Because existing virtual private networks are based on network layer within network layer encapsulation, they are generally only capable of providing connection-less datagram type services. Because datagram type services do not guarantee delivery of packets, existing tunnels can only easily employ encryption methods over the data contained within each transmitted packet. Encryption based on the contents of multiple packets is desirable, such as cipher block chaining or stream ciphering over multiple packets. For example, encrypted data would advantageously be formed based not only on the contents of the present packet data being encrypted, but also based on some attribute of the connection or session history between the communicating stations. Examples of encryption algorithms and keyed encryption are disclosed in many textbooks, for example "Applied Cryptography—Protocols, Algorithms, and Source Code in C", by Bruce Schneier, published by John Wiley and Sons, New York, N.Y. copyright 1994.

Thus there is required a new pseudo network adapter providing a virtual private network having a dynamically determined end point to support a user in a mobile computing environment. The new pseudo network adapter should appear to the communications protocol stack of the node as an interface to an actual physical device. The new pseudo network adapter should support guaranteed, in-order delivery of frames over a tunnel to conveniently support cipher block chaining mode or stream cipher encryption over multiple packets.

SUMMARY

A new pseudo network adapter is disclosed providing a virtual private network. The new system includes an interface for capturing packets from a local communications protocol stack for transmission on the virtual private network. The interface appears to the local communications stack as a network adapter device driver for a network adapter.

The system further includes a Dynamic Host Configuration Protocol (DHCP) server emulator, and an Address Resolution Protocol (ARP) server emulator. The new system indicates to the local communications protocol stack that nodes on a remote private network are reachable through a gateway that is in turn reachable through the pseudo network adapter. The new pseudo network adapter includes a transmit path for processing data packets from the local communications protocol stack for transmission through the pseudo network adapter. The transmit path includes an encryption engine for encrypting the data packets and an encapsulation engine for encapsulating the encrypted data packets into tunnel data frames. The pseudo network adapter passes the tunnel data frames back to the local communications protocol stack for transmission to a physical network adapter on a remote server node.

In a further aspect of the present system, the pseudo network adapter includes a digest value in a digest field in each of the tunnel data frames. A keyed hash function is a hash function which takes data and a shared cryptographic key as inputs and outputs a digital signature referred to as a digest. The value of the digest field is equal to an output of a keyed hash function applied to data consisting of the data packet encapsulated within the tunnel data frame concatenated with a counter value equal to a total number of tunnel data frames previously transmitted to the remote server node. In another aspect of the system, the pseudo network adapter processes an Ethernet header in each one of the captured data packets, including removing the Ethernet header.

The new pseudo network adapter further includes an interface into a transport layer of the local communications protocol stack for capturing received data packets from the remote server node, and a receive path for processing received data packets captured from the transport layer of the local communications protocol stack. The receive path includes a decapsulation engine, and a decryption engine, and passes the decrypted, decapsulated data packets back to the local communications protocol stack for delivery to a user.

Thus there is disclosed a new pseudo network adapter providing a virtual private network having dynamically determined end points to support users in a mobile computing environment. The new pseudo network adapter provides a system for capturing a fully formed frame prior to transmission. The new pseudo network adapter appears to the communications protocol stack of the station as an interface to an actual physical device. The new pseudo network adapter further includes encryption capabilities to conveniently provide secure communications between tunnel end points using stream mode encryption or cipher block chaining over multiple packets.

BRIEF DESCRIPTION OF THE DRAWINGS

The foregoing features and other aspects of the invention will now become apparent when the accompanying description is read in conjunction with the following drawings in which.

DETAILED DESCRIPTION OF THE PREFERRED EMBODIMENTS

Figure 1:
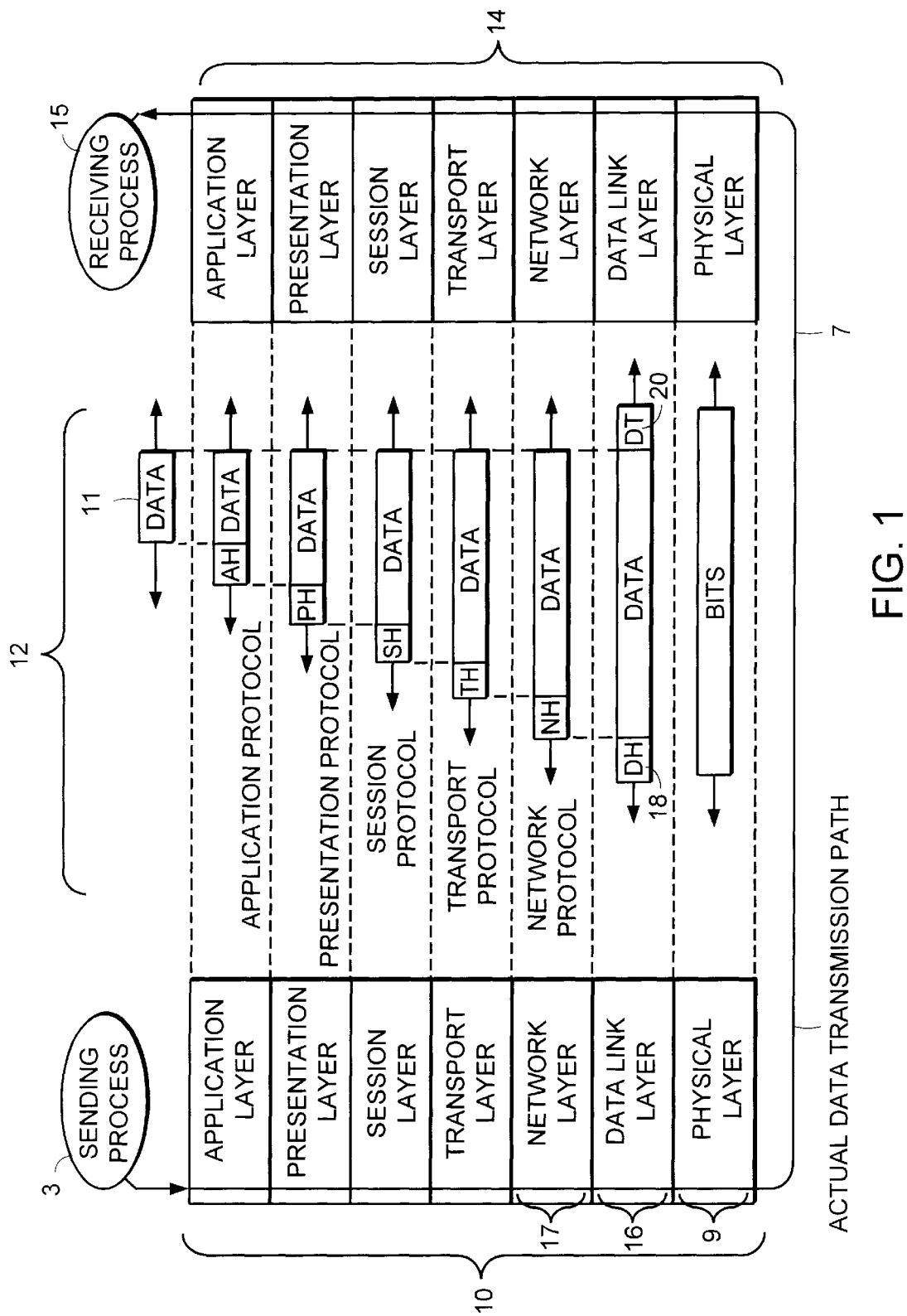
FIG. 1 is a block diagram showing the Open Systems Interconnection (OSI) reference model.

Now with reference to FIG. 1 there is described for purposes of explanation, communications based on the Open Systems Interconnection (OSI) reference model. In FIG. 1 there is shown communications 12 between a first protocol stack 10 and a second protocol stack 14. The first protocol stack 10 and second protocol stack 14 are implementations of the seven protocol layers (Application layer, Presentation layer, Session layer, Transport layer, Network layer, Data link layer, and Physical layer) of the OSI reference model. A protocol stack implementation is typically in some combination of software and hardware. Descriptions of the specific services provided by each protocol layer in the OSI reference model are found in many text books, for example "Computer Networks", Second Edition, by Andrew S. Tannenbaum, published by Prentice-Hall, Englewood Cliffs, N.J., copyright 1988.

As shown in FIG. 1, data 11 to be transmitted from a sending process 13 to a receiving process 15 is passed down through the protocol stack 10 of the sending process to the physical layer 9 for transmission on the data path 7 to the receiving process 15. As the data 11 is passed down through the protocol stack 10, each protocol layer prepends a header (and possibly also appends a trailer) portion to convey information used by that protocol layer. For example, the data link layer 16 of the sending process wraps the information received from the network layer 17 in a data link header 18 and a data link layer trailer 20 before the message is passed to the physical layer 9 for transmission on the actual transmission path 7.

Figure 2:
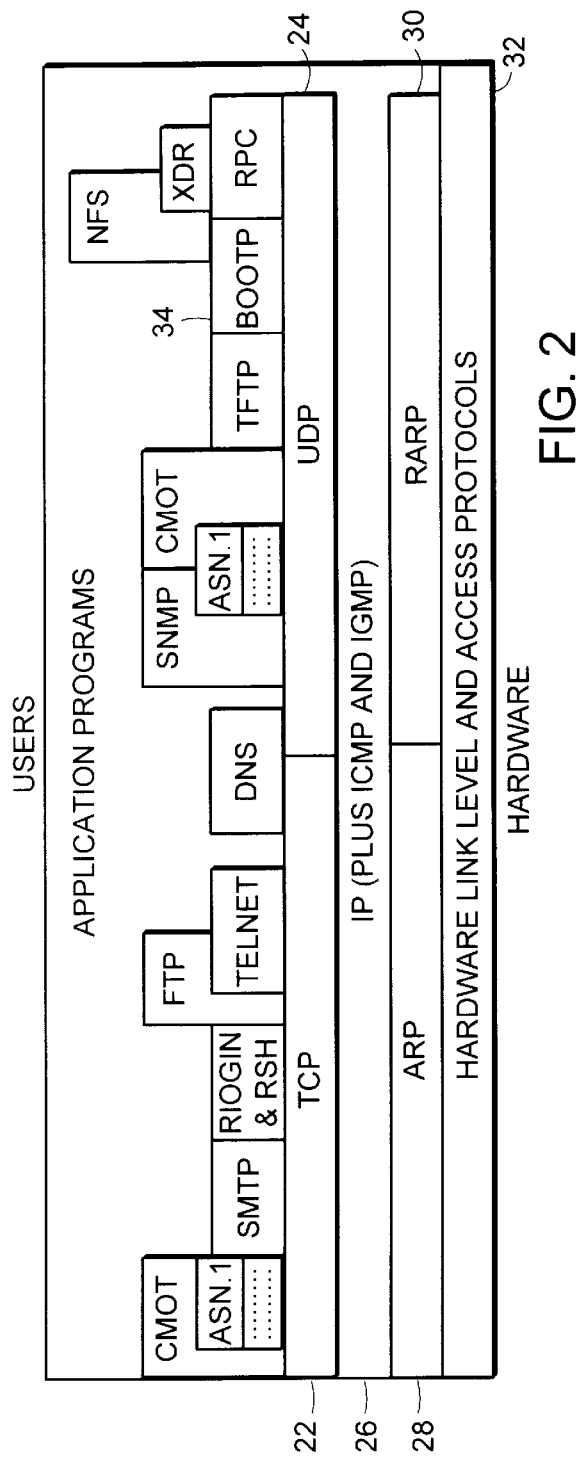
FIG. 2 is a block diagram showing the TCP/IP internet protocol suite.

FIG. 2 shows the TCP/IP protocol stack. Some protocol layers in the TCP/IP protocol stack correspond with layers in the OSI protocol stack shown in FIG. 1. The detailed services and header formats of each layer in the TCP/IP protocol stack are described in many texts, for example "Internetworking with TCP/IP, Vol 1: Principles, Protocols, and Architecture", Second Edition, by Douglas E. Comer, published by Prentice-Hall, Englewood Cliffs, N.J. copyright 1991. The Transport Control Protocol (TCP) 22 corresponds to the Transport layer in the OSI reference model. The TCP protocol 22 provides a connection-oriented, end to end transport service with guaranteed, in-sequence packet delivery. In this way the TCP protocol 22 provides a reliable, transport layer connection.

The IP protocol 26 corresponds to the Network layer of the OSI reference model. The IP protocol 26 provides no guarantee of packet delivery to the upper layers. The hardware link level and access protocols 32 correspond to the Data link and Physical layers of the OSI reference model.

The Address Resolution Protocol (ARP) 28 is used to map IP layer addresses (referred to as "IP addresses") to addresses used by the hardware link level and access protocols 32 (referred to as "physical addresses" or "MAC addresses"). The ARP protocol layer in each network station typically contains a table of mappings between IP addresses and physical addresses (referred to as the "ARP cache"). When a mapping between an IP address and the corresponding physical address is not known, the ARP protocol 28 issues a broadcast packet (an "ARP request" packet) on the local network. The ARP request indicates an IP address for which a physical address is being requested. The ARP protocols 28 in each station connected to the local network examine the ARP request, and if a station recognizes the IP address indicated by the ARP request, it issues a response (an "ARP response" or "ARP reply" packet) to the requesting station indicating the responder's physical address. The requesting ARP protocol reports the received physical address to the local IP layer which then uses it to send datagrams directly to the responding station. As an alternative to having each station respond only for its own IP address, an ARP server may be used to respond for a set of IP addresses it stores internally, thus potentially eliminating the requirement of a broadcast request. In that case, the ARP request can be sent directly to the ARP server for physical addresses corresponding to any IP address mappings stored within the ARP server.

At system start up, each station on a network must determine an IP address for each of its network interfaces before it can communicate using TCP/IP. For example, a station may need to contact a server to dynamically obtain an IP address for one or more of its network interfaces. The station may use what is referred to as the Dynamic Host Configuration Protocol (DHCP) to issue a request for an IP address to a DHCP server. For example, a DHCP module broadcasts a DHCP request packet at system start up requesting allocation of an IP address for an indicated network interface. Upon receiving the DHCP request packet, the DHCP server allocates an IP address to the requesting station for use with the indicated network interface. The requesting station then stores the IP address in the response from the server as the IP address to associate with that network interface when communicating using TCP/IP.

Figure 3:
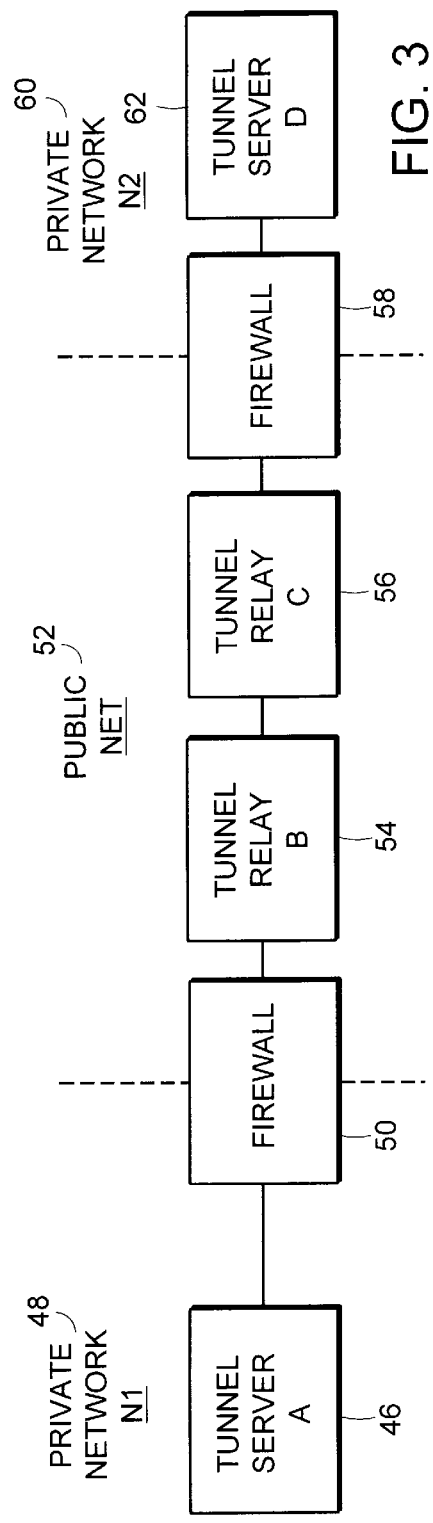
FIG. 3 is a block diagram showing an example embodiment of a tunnel connection across a public network between two tunnel servers.

FIG. 3 shows an example configuration of network nodes for which the presently disclosed system is applicable. In the example of FIG. 3, the tunnel server A is an initiator of the tunnel connection. As shown in FIG. 3, the term "tunnel relay" node is used to refer to a station which forwards data packets between transport layer connections (for example TCP connections).

For example, in the present system a tunnel relay may be dynamically configured to forward packets between transport layer connection 1 and transport layer connection 2. The tunnel relay replaces the header information of packets received over transport layer connection 1 with header information indicating transport layer connection 2. The tunnel relay can then forward the packet to a firewall, which may be conveniently programmed to pass packets received over transport layer connection 2 into a private network on the other side of the firewall. In the present system, the tunnel relay dynamically forms transport layer connections when a tunnel connection is established. Accordingly the tunnel relay is capable of performing dynamic load balancing or providing redundant service for fault tolerance over one or more tunnel servers at the time the tunnel connection is established.

FIG. 3 shows a Tunnel Server A 46 in a private network N1 48, physically connected with a first Firewall 50. The first Firewall 50 separates the private network N1 48 from a public network 52, for example the Internet. The first Firewall 50 is for example physically connected with a Tunnel Relay B 54, which in turn is virtually connected through the public network 52 with a Tunnel Relay C. The connection between Tunnel Relay B and Tunnel Relay C may for example span multiple intervening forwarding nodes such as routers or gateways through the public network 52.

The Tunnel Relay C is physically connected with a second Firewall 58, which separates the public network 52 from a private network N2 60. The second Firewall 58 is physically connected with a Tunnel Server D 62 on the private network N2 60. During operation of the elements shown in FIG. 3, the Tunnel Server D 62 provides routing of IP packets between the tunnel connection with Tunnel Server A 46 and other stations on the private network N2 60. In this way the Tunnel Server D 62 acts as a router between the tunnel connection and the private network N2 60.

During operation of the elements shown in FIG. 3, the present system establishes a tunnel connection between the private network N1 48 and the private network N2 60. The embodiment of FIG. 3 thus eliminates the need for a dedicated physical cable or line to provide secure communications between the private network 48 and the private network 60. The tunnel connection between Tunnel Server A 46 and Tunnel Server D 62 is composed of reliable, pair-wise transport layer connections between Tunnel Server A 46 (node "A"), Tunnel Relay B 54 (node "B"), Tunnel Relay C 56 (node "C"), and Tunnel Server D 62 (node "D"). For example, such pair-wise connections may be individual transport layer connections between each node A and node B, node B and node C, and node C and node D. In an alternative embodiment, as will be described below, a tunnel connection may alternatively be formed between a stand-alone PC in a public network and a tunnel server within a private network.

Figure 4:
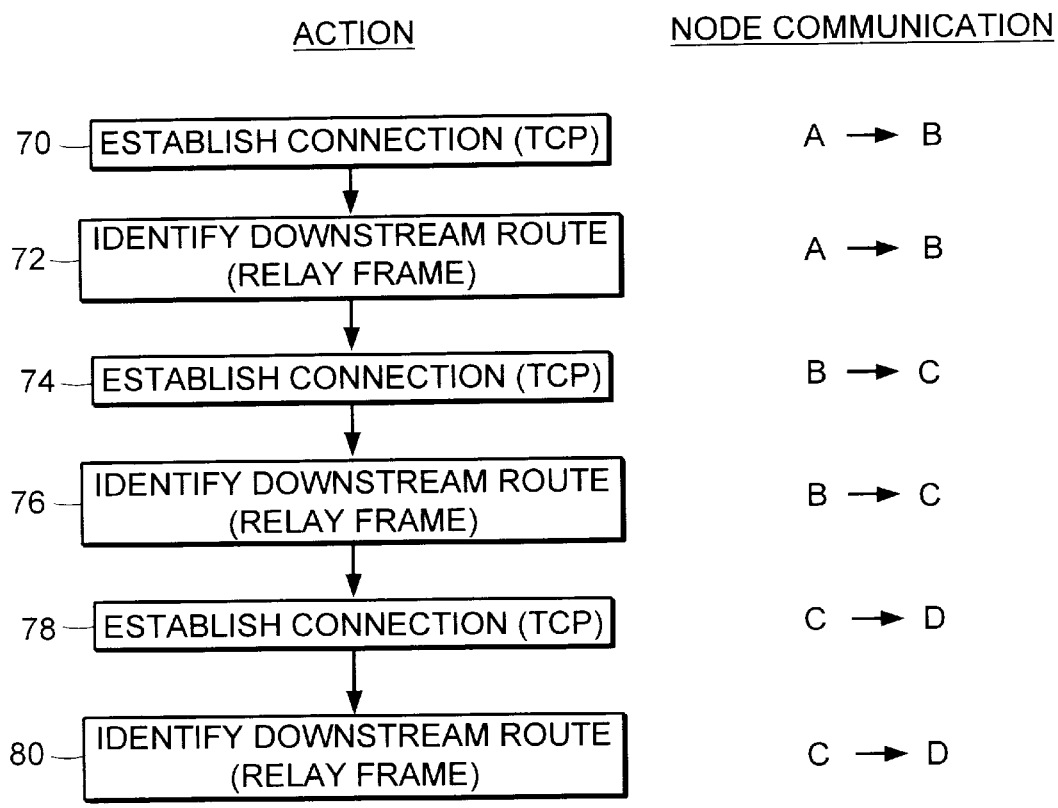
FIG. 4 is a flow chart showing an example embodiment of steps performed to establish a tunnel connection.
Figure 5:
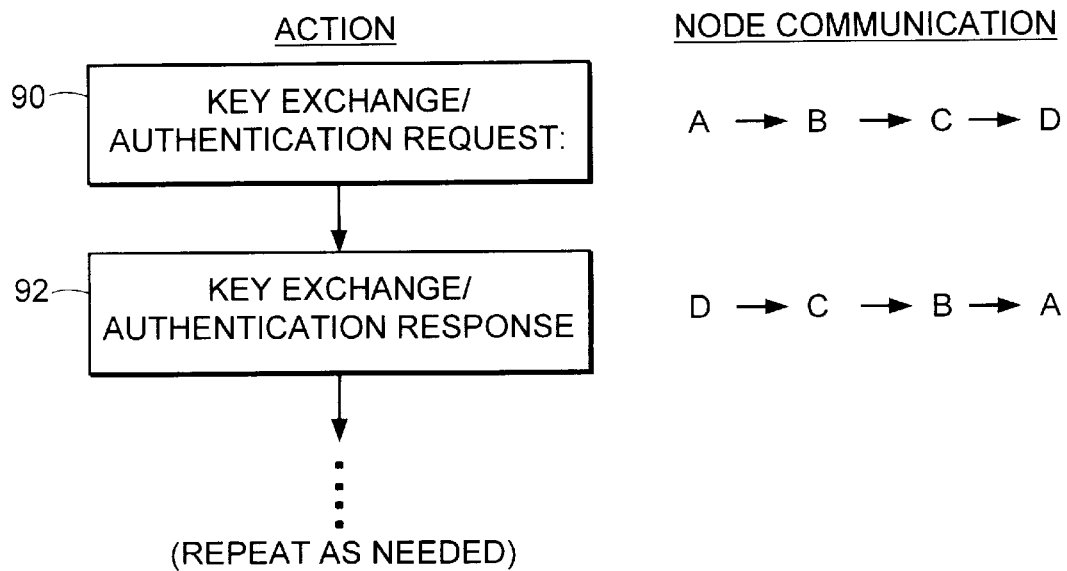
FIG. 5 is a flow chart showing an example embodiment of steps performed to perform session key management for a tunnel connection.

FIG. 4 and FIG. 5 show an example embodiment of steps performed during establishment of the tunnel connection between Tunnel Server A 46 (node "A") and Tunnel Server D 62 (node "D") as shown in FIG. 3. Prior to the steps shown in FIG. 4, node A selects a tunnel path to reach node D. The tunnel path includes the tunnel end points and any intervening tunnel relays. The tunnel path is for example predetermined by a system administrator for node A. Each tunnel relay along the tunnel path is capable of finding a next node in the tunnel path, for example based on a provided next node name (or "next node arc"), using a predetermined naming convention and service, for example the Domain Name System (DNS) of the TCP/IP protocol suite.

During the steps shown in FIG. 4, each of the nodes A, B and C perform the following steps:

resolve the node name of the next node in the tunnel path, for example as found in a tunnel relay frame;

establish a reliable transport layer (TCP) connection to the next node in the tunnel path;

forward the tunnel relay frame down the newly formed reliable transport layer connection to the next node in the tunnel path.

As shown for example in FIG. 4, at step 70 node A establishes a reliable transport layer connection with node B. At step 72 node A identifies the next downstream node to node B by sending node B a tunnel relay frame over the reliable transport layer connection between node A and node B. The tunnel relay frame contains a string buffer describing all the nodes along the tunnel path (see below description of an example tunnel relay frame format). At step 74, responsive to the tunnel relay frame from node A, node B searches the string buffer in the relay frame to determine if the string buffer includes node B's node name. If node B finds its node name in the string buffer, it looks at the next node name in the string buffer to find the node name of the next node in the tunnel path.

Node B establishes a reliable transport layer connection with the next node in the tunnel path, for example node C. Node B further forms an association between the reliable transport layer connection between Node A and Node B, over which the relay frame was received, and the newly formed reliable transport layer connection between Node B and Node C, and as a result forwards subsequent packets received over the reliable transport layer connection with Node A onto the reliable transport layer connection with Node C, and vice versa. At step 76 node B forwards the tunnel relay frame on the newly formed reliable transport layer connection to node C.

At step 78, responsive to the relay frame forwarded from node B, node C determines that the next node in the tunnel path is the last node in the tunnel path, and accordingly is a tunnel server. Node C may actively determine whether alternative tunnel servers are available to form the tunnel connection. Node C may select one of the alternative available tunnel servers to form the tunnel connection in order to provide load balancing or fault tolerance. As a result node C may form a transport layer connections with one of several available tunnel servers, for example a tunnel server that is relatively underutilized at the time the tunnel connection is established. In the example embodiment, node C establishes a reliable transport layer connection with the next node along the tunnel path, in this case node D.

Node C further forms an association between the reliable transport layer connection between Node B and Node C, over which the relay frame was received, and the newly formed reliable transport layer connection between Node C and Node D, and as a result forwards subsequent packets received over the reliable transport layer connection with Node B to the reliable transport layer connection with Node D, and vice versa. At step 80 node C forwards the relay frame to node D on the newly formed reliable transport layer connection.

FIG. 5 shows an example of tunnel end point authentication and sharing of key exchange material provided by the present system. The present system supports passing authentication data and key exchange material through the reliable transport layer connections previously established on the tunnel path. The following are provided by use of a key exchange/authentication REQUEST frame and a key exchange/authentication RESPONSE frame:

a) mutual authentication of both endpoints of the tunnel connection;

b) establishment of shared session encryption keys and key lifetimes for encrypting/authenticating subsequent data sent through the tunnel connection;

c) agreement on a shared set of cryptographic transforms to be applied to subsequent data; and d) exchange of any other connection-specific data between the tunnel endpoints, for example strength and type of cipher to be used, any compression of the data to be used, etc. This data can also be used by clients of this protocol to qualify the nature of the authenticated connection.

At step 90 a key exchange/authentication request frame is forwarded over the reliable transport layer connections formed along the tunnel path from node A to node D. At step 92, a key exchange/authentication response frame is forwarded from node D back to node A through the reliable transport layer connections. The attributes exchanged using the steps shown in FIG. 5 may be used for the lifetime of the tunnel connection. In an alternative embodiment the steps shown in FIG. 5 are repeated as needed for the tunnel end points to exchange sufficient key exchange material to agree upon a set of session parameters for use during the tunnel connection such as cryptographic keys, key durations, and choice of encryption/decryption algorithms.

Further in the disclosed system, the names used for authentication and access control with regard to node A and node D need not be the network layer address or physical address of the nodes. For example, in an alternative embodiment where the initiating node sending the tunnel relay frame is a stand-alone PC located within a public network, the user's name may be used for authentication and/or access control purposes. This provides a significant improvement over existing systems which base authorization on predetermined IP addresses.

Figure 6:
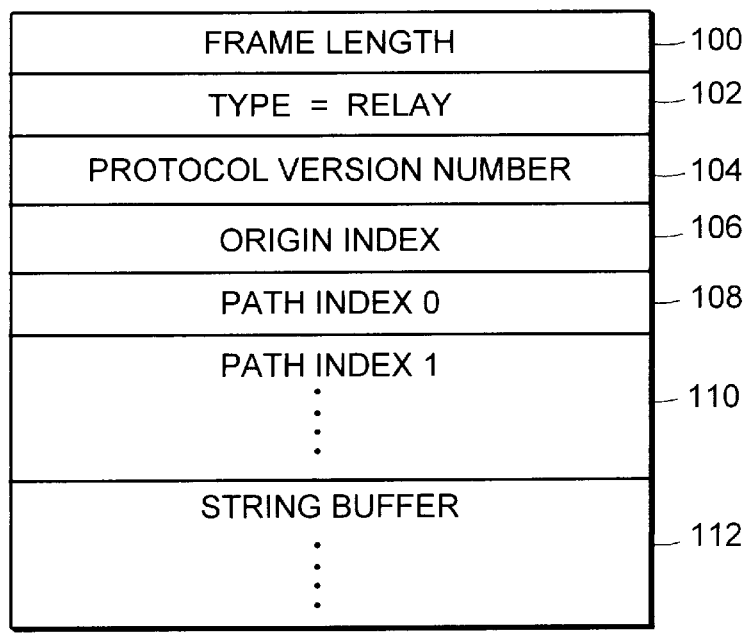
FIG. 6 is a block diagram showing an example embodiment of a relay frame.

FIG. 6 shows the format of an example embodiment of a tunnel relay frame. The tunnel frame formats shown in FIGS. 6, 7, 8 and 9 are encapsulated within the data portion of a transport layer (TCP) frame when transmitted. Alternatively, another equivalent, connection-oriented transport layer protocol having guaranteed, in-sequence frame delivery may be used. The example TCP frame format, including TCP header fields, is conventional and not shown.

The field 100 contains a length of the frame. The field 102 contains a type of the frame, for example a type of RELAY. The field 104 contains a tunnel protocol version number. The field 106 contains an index into a string buffer field 112 at which a name of the originating node is located, for example a DNS host name of the node initially issuing the relay frame (node A in FIG. 3). The fields following the origin index field 106 contain indexes into the string buffer 112 at which names of nodes along the tunnel path are located. For example each index may be the offset of a DNS host name within the string buffer 112. In this way the field 108 contains the index of the name of the first node in the tunnel path, for example node B (FIG. 3). The field 110 contains the index of the name of the second node in the tunnel path, etc. The field 112 contains a string of node names of nodes in the tunnel path.

During operation of the present system, the initiating node, for example node A as shown in FIG. 3, transmits a tunnel relay frame such as the tunnel relay frame shown in FIG. 6. Node A sends the tunnel relay frame to the first station along the tunnel path, for example node B (FIG. 3), over a previously established reliable transport layer connection. Node B searches the string buffer in the tunnel relay frame to find its node name, for example its DNS host name. Node B finds its node name in the string buffer indexed by path index 0, and then uses the contents of path index 1 110 to determine the location within the string buffer 112 of the node name of the next node along the tunnel path. Node B uses this node name to establish a reliable transport layer connection with the next node along the tunnel path. Node B then forwards the relay frame to the next node. This process continues until the end node of the tunnel route, for example tunnel server D 62 (FIG. 3) is reached.

Figure 7:
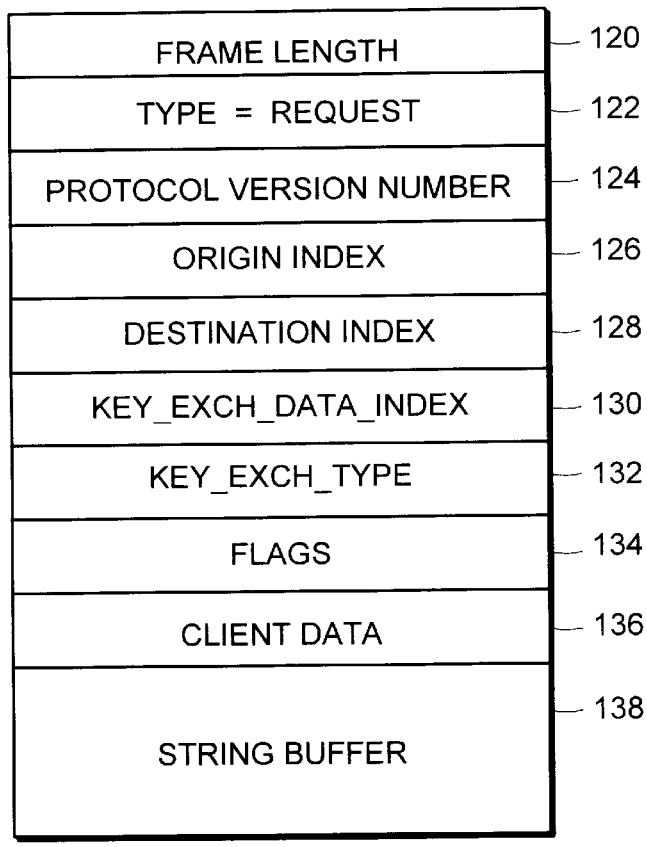
FIG. 7 is a block diagram showing an example embodiment of a connection request frame.

FIG. 7 shows the format of an example embodiment of a key exchange/key authentication request frame. The field 120 contains a length of the frame. The field 122 contains a type of the frame, for example a type of REQUEST indicating a key exchange/key authentication request frame. The field 124 contains a tunnel protocol version number. The field 126 contains an offset of the name of the entity initiating the tunnel connection, for example the name of a user on the node originally issuing the request frame. This name and key exchange material in the request frame are used by the receiving tunnel end point to authenticate the key exchange/authentication REQUEST. The name of the entity initiating the tunnel connection is also use to authorize any subsequent tunnel connection, based on predetermined security policies of the system. The field 128 contains an offset into the frame of the node name of the destination node, for example the end node of the tunnel shown as node D 62 in FIG. 3.

The field 130 contains an offset into the frame at which key exchange data as is stored, for example within the string buffer field 138. The key exchange data for example includes key exchange material used to determine a shared set of encryption parameters for the life of the tunnel connection such as cryptographic keys and any validity times associated with those keys. The key exchange data, as well as the field 132, further include information regarding any shared set of cryptographic transforms to be used and any other connection-specific parameters, such as strength and type of cipher to be used, type of compression of the data to be used, etc. The field 134 contains flags, for example indicating further information about the frame. The field 136 contains client data used in the tunnel end points to configure the local routing tables so that packets for nodes reachable through the virtual private network are sent through the pseudo network adapters. In an example embodiment, the string buffer 138 is encrypted using a public encryption key of the receiving tunnel end point.

During operation of the present system, one of the end nodes of the tunnel sends a key exchange/authentication REQUEST frame as shown in FIG. 7 to the other end node of the tunnel in order to perform key exchange and authentication as described in step 90 of FIG. 5.

Figure 8:
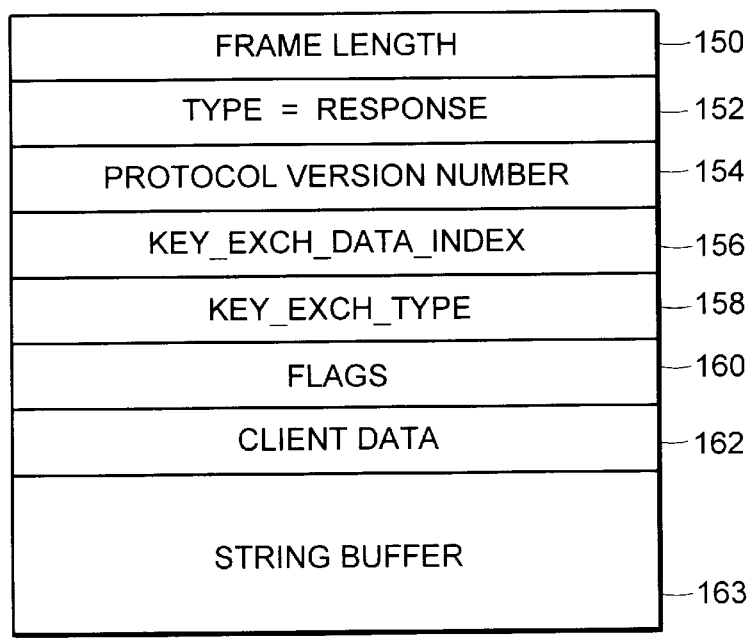
FIG. 8 is a block diagram showing an example embodiment of a connection response frame.

FIG. 8 shows the format of an example embodiment of a key exchange/key authentication response frame, referred to as a connection RESPONSE frame. The field 150 contains a length of the frame. The field 152 contains a type of the frame, for example a type of connection RESPONSE indicating a key exchange/key authentication request frame. The field 154 contains a tunnel protocol version number.

The field 156 contains an offset into the frame at which key exchange data as is stored, for example within the string buffer field 163. The key exchange data for example includes key exchange material to be used for encryption/decryption over the life of the tunnel connection and any validity times associated with that key exchange material. The key exchange data, as well as the field 158, further includes information regarding any shared set of cryptographic transforms to be applied to subsequent data and any other connection-specific parameters, such as strength and type of cipher to be used, any compression of the data to be used, etc. The field 160 contains flags, for example indicating other information about the frame. The client data field 162 contains data used by the pseudo network adapters in the tunnel end points to configure the local routing tables so that packets for nodes in the virtual private network are sent through the pseudo network adapters. The string buffer includes key exchange material. The string buffer is for example encrypted using a public encryption key of the receiving tunnel end point, in the this case the initiator of the tunnel connection.

During operation of the present system, one of the end nodes of the tunnel sends a key exchange/authentication RESPONSE frame as shown in FIG. 7 to the other end node of the tunnel in order to perform key exchange and authentication as described in step 92 of FIG. 5.

Figure 9:
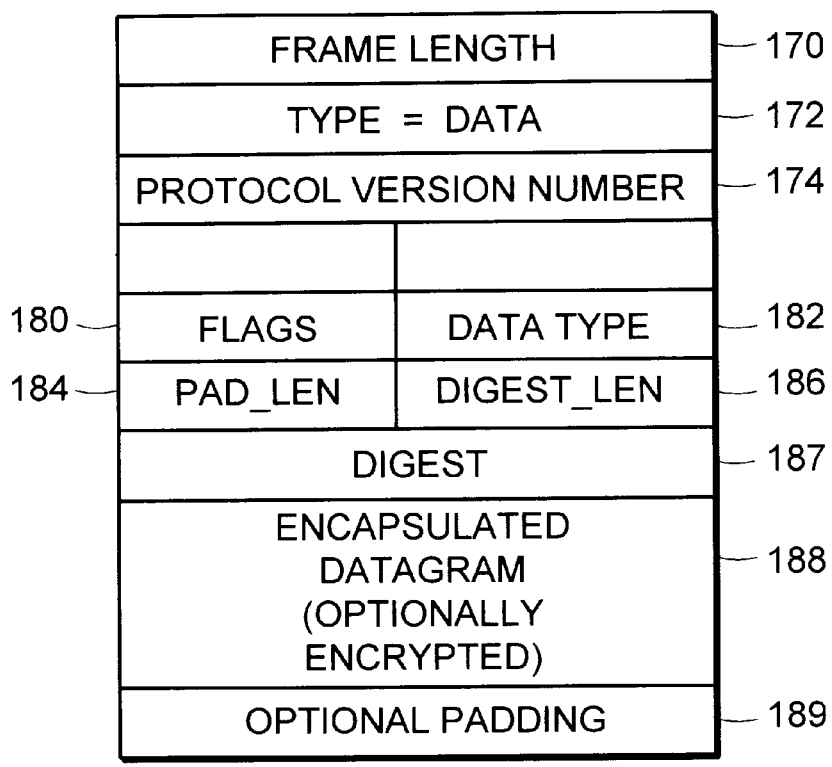
FIG. 9 is a block diagram showing an example embodiment of a data frame.

FIG. 9 shows the format of an example embodiment of an tunnel data frame used to communicate through a tunnel connection. FIG. 9 shows how an IP datagram may be encapsulated within a tunnel frame by the present system for secure communications through a virtual private network. The field 170 contains a length of the frame. The field 172 contains a type of the frame, for example a type of DATA indicating a tunnel data frame. The field 174 contains a tunnel protocol version number.

The fields 176, 178 and 182 contain information regarding the encapsulated datagram. The field 180 contains flags indicating information regarding the frame. The field 184 contains a value indicating the length of the optional padding 189 at the end of the frame. The frame format allows for optional padding in the event that the amount of data in the frame needs to be padded to an even block boundary for the purpose of being encrypted using a block cipher. The field 186 contains a value indicating the length of the digest field 187.

The data frame format includes a digital signature generated by the transmitting tunnel end point referred to as a "digest". The value of the digest ensures data integrity, for example by detecting invalid frames and replays of previously transmitted valid frames. The digest is the output of a conventional keyed cryptographic hash function applied to both the encapsulated datagram 190 and a monotonically increasing sequence number. The resulting hash output is passed as the value of the digest field 187. The sequence number is not included in the data frame. In the example embodiment, the sequence number is a counter maintained by the transmitter (for example node A in FIG. 3) of all data frames sent to the receiving node (for example node D in FIG. 3) since establishment of the tunnel connection.

In order to determine if the data frame is invalid or a duplicate, the receiving node decrypts the encapsulated datagram 190, and applies the keyed cryptographic hash function (agreed to by the tunnel end nodes during the steps shown in FIG. 5) to both the decrypted encapsulated datagram and the value of a counter indicating the number of data frames received from the transmitter since establishment of the tunnel connection. For example the keyed hash function is applied to the datagram concatenated to the counter value. If the resulting hash output matches the value of the digest field 187, then the encapsulated datagram 190 was received correctly and is not a duplicate. If the hash output does not match the value of the digest field 187, then the integrity check fails, and the tunnel connection is closed. The field 188 contains an encrypted network layer datagram, for example an encrypted IP datagram.

The encapsulated datagram may be encrypted using various encryption techniques. An example embodiment of the present system advantageously encrypts the datagram 190 using either a stream cipher or cipher block chaining encryption over all data transmitted during the life of the tunnel connection. This is enabled by the reliable nature of the transport layer connections within the tunnel connection. The specific type of encryption and any connection specific symmetric encryption keys used is determined using the steps shown in FIG. 5. The fields in the tunnel data frame other than the encapsulated datagram 188 are referred to as the tunnel data frame header fields.

Figure 10:
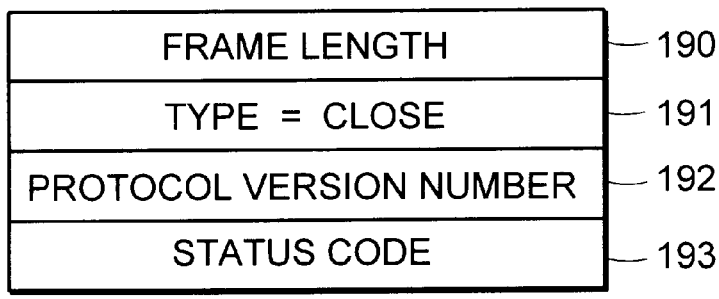
FIG. 10 is a block diagram showing an example embodiment of a close connection frame.

FIG. 10 is a block diagram showing an example embodiment of a "close connection" frame. The field 190 contains the length of the frame. The field 191 contains a frame type, for example having a value equal to CLOSE. Field 192 contains a value equal to the current protocol version number of the tunnel protocol. The field 193 contains a status code indicating the reason the tunnel connection is being closed.

During operation of the present system, when end point of a tunnel connection determines that the tunnel connection should be closed, a close connection frame as shown in FIG. 10 is transmitted to the other end point of the tunnel connection. When a close connection close frame is received, the receiver closes the tunnel connection and no further data will be transmitted or received through the tunnel connection.

Figure 11:
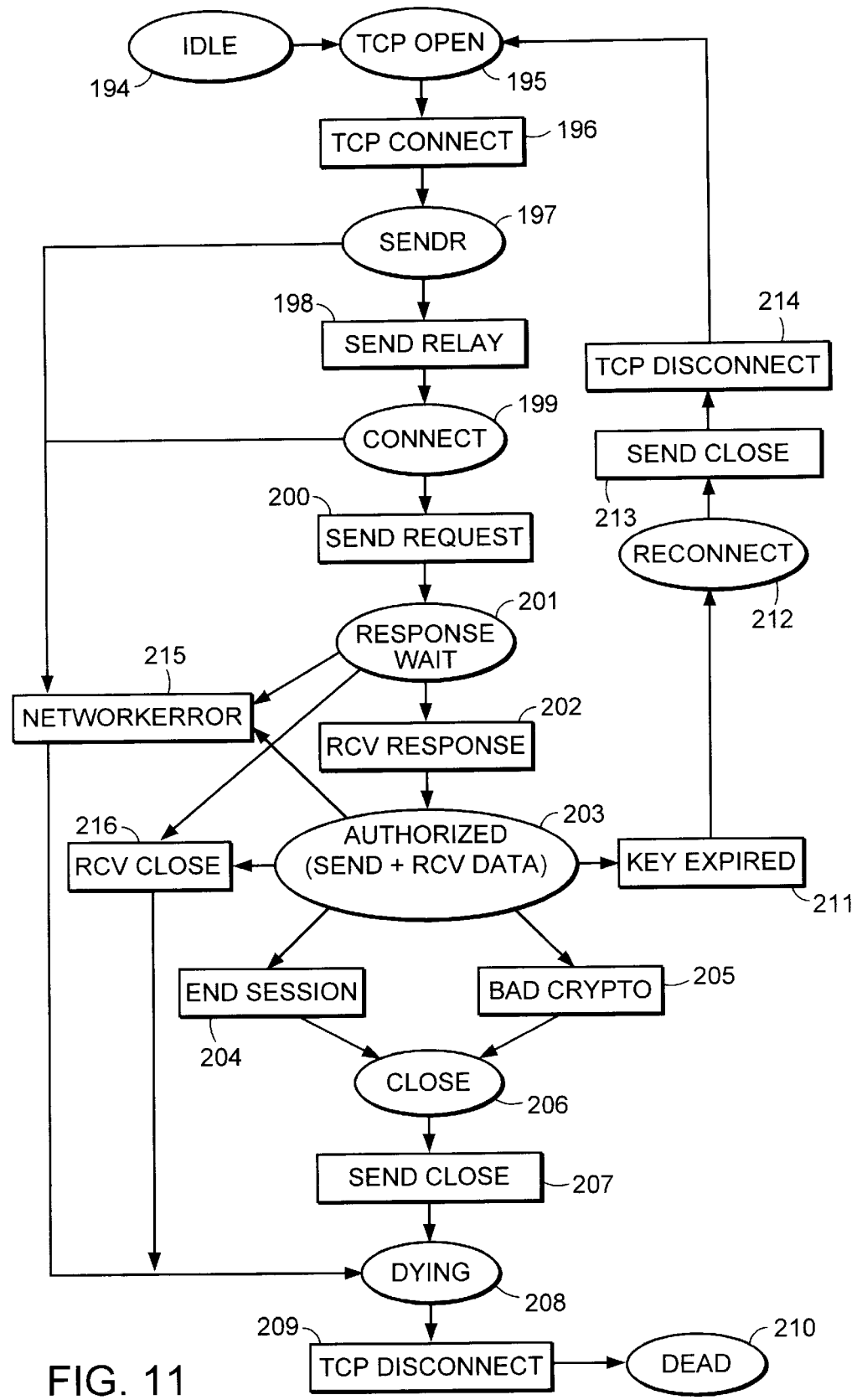
FIG. 11 is a state diagram showing an example embodiment of a state machine forming a tunnel connection in a network node initiating a tunnel connection.
Figure 12:
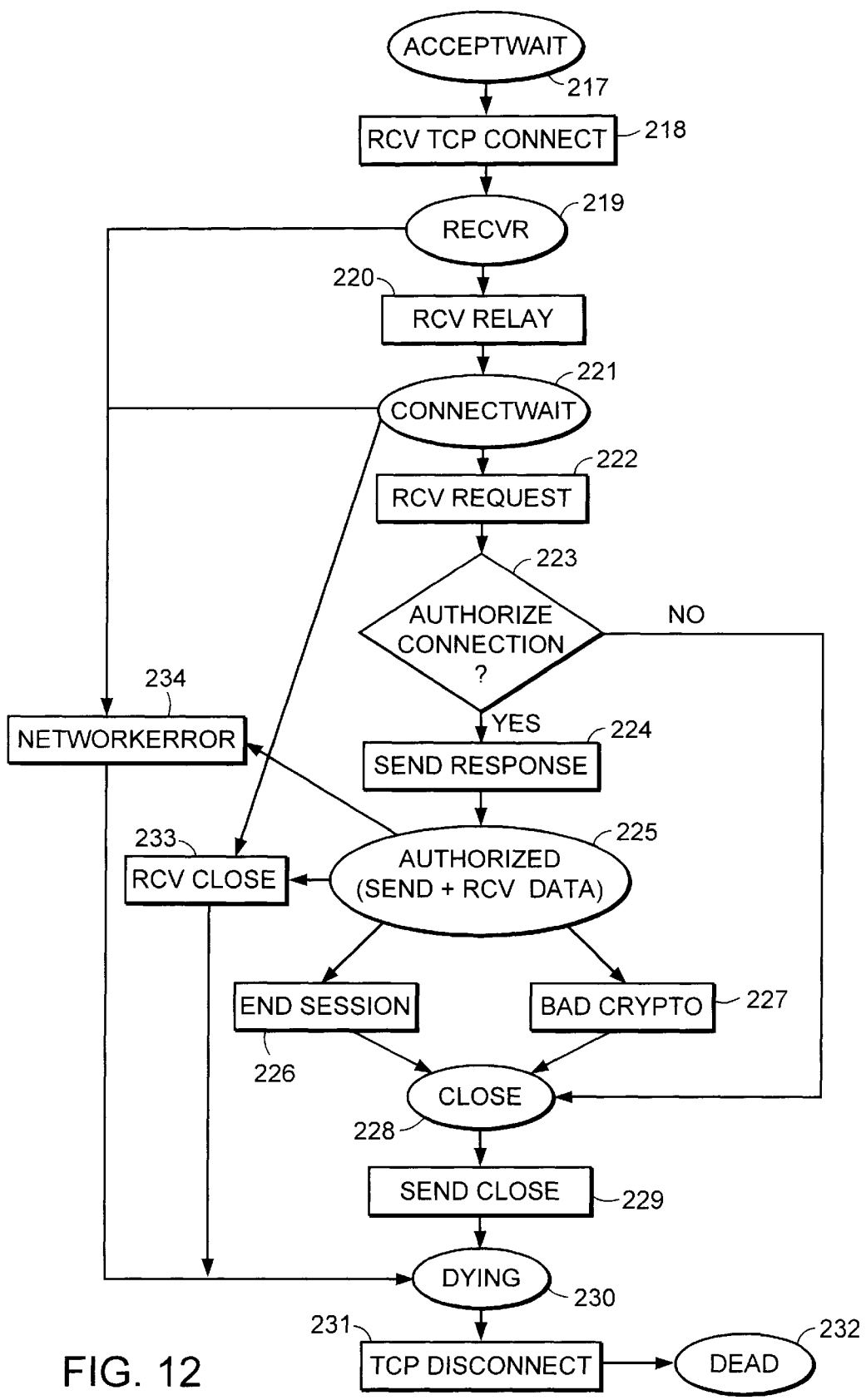
FIG. 12 is a state diagram showing an example embodiment of a state machine forming a tunnel connection in a server computer.
Figure 13:
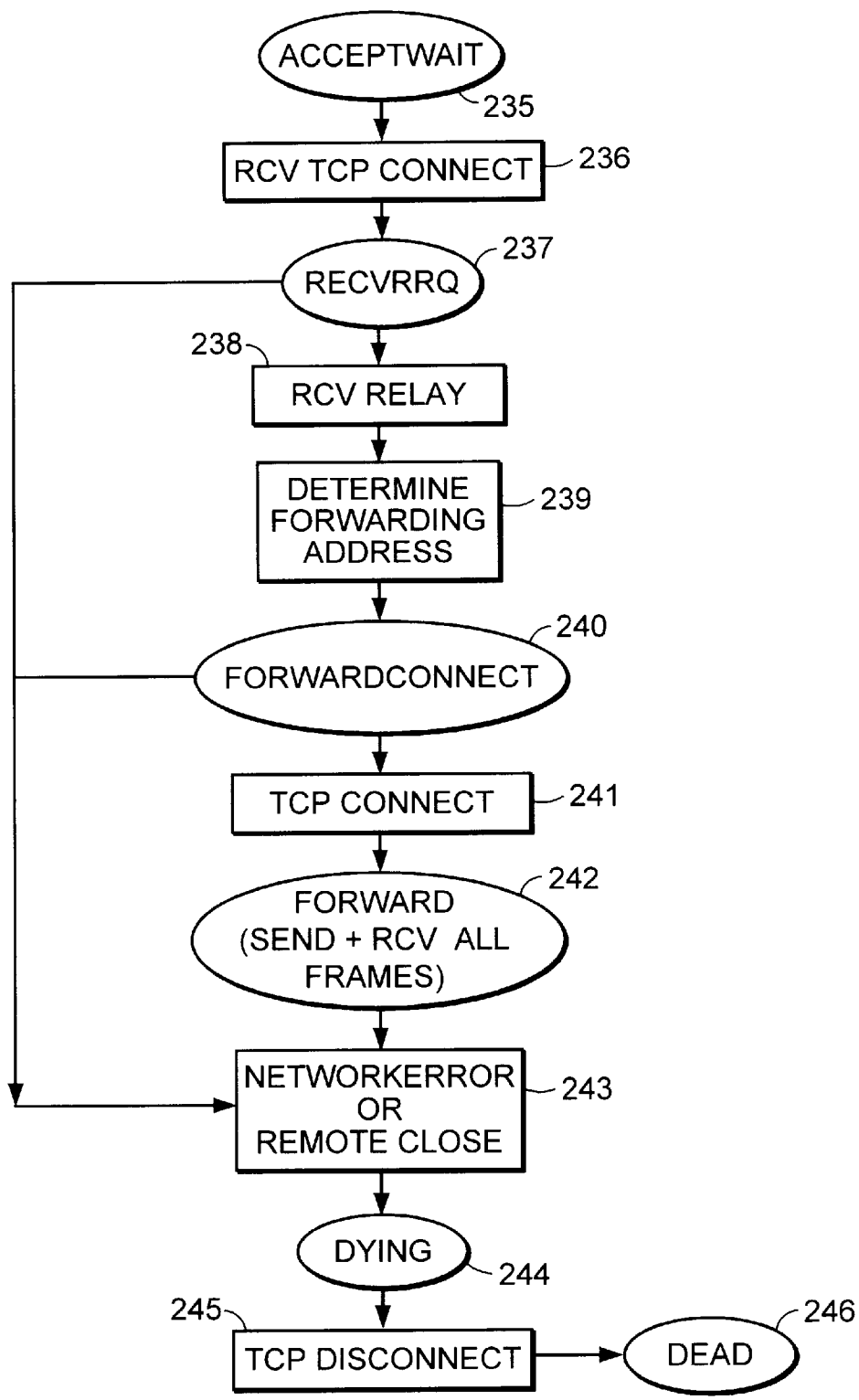
FIG. 13 is a state diagram showing an example embodiment of a state machine forming a tunnel connection in a relay node.

FIG. 11 is a state diagram showing an example embodiment of forming a tunnel connection in a node initiating a tunnel connection. In FIG. 11, FIG. 12, and FIG. 13, states are indicated by ovals and actions or events are indicated by rectangles. For example the tunnel server node A as shown in FIG. 3 may act as a tunnel connection initiator when establishing a tunnel connection with the tunnel server node D. Similarly the client system 247 in FIG. 14 may act as a tunnel connection initiator when establishing a tunnel connection with the tunnel server. The tunnel initiator begins in an idle state 194. Responsive to an input from a user indicating that a tunnel connection should be established, the tunnel initiator transitions from the idle state 194 to a TCP Open state 195. In the TCP Open state 195, the tunnel initiator establishes a reliable transport layer connection with a first node along the tunnel path. For example, the tunnel initiator opens a socket interface associated with a TCP connection to the first node along the tunnel path. In FIG. 3 node A opens a socket interface associated with a TCP connection with node B.

Following establishment of the reliable transport layer connection in the TCP Open state 195, the tunnel initiator enters a Send Relay state 197. In the Send Relay state 197, the tunnel initiator transmits a relay frame at 198 over the reliable transport layer connection. Following transmission of the relay frame, the tunnel initiator enters the connect state 199. If during transmission of the relay frame there is a transmission error, the tunnel initiator enters the Network Error state 215 followed by the Dying state 208. In the Dying state 208, the tunnel initiator disconnects the reliable transport layer connection formed in the TCP Open state 195, for example by disconnecting a TCP connection with Node B. Following the disconnection at 209, the tunnel initiator enters the Dead state 210. The tunnel initiator subsequently transitions back to the Idle state 194 at a point in time predetermined by system security configuration parameters.

In the Connect state 199, the tunnel initiator sends a key exchange/authentication REQUEST frame at 200 to the tunnel server. Following transmission of the key exchange/authentication REQUEST frame 200, the tunnel initiator enters the Response Wait state 201. The tunnel initiator remains in the Response Wait state 201 until it receives a key exchange/authentication RESPONSE frame 202 from the tunnel server. After the key exchange/authentication RESPONSE frame is received at 202, the tunnel initiator enters the Authorized state 203, in which it may send or receive tunnel data frames. Upon receipt of a CLOSE connection frame at 216 in the Authorized state 203, the tunnel initiator transitions to the Dying state 208.

Upon expiration of a session encryption key at 211, the tunnel initiator enters the Reconnect state 212, and sends a CLOSE connection frame at 213 and disconnects the TCP connection with the first node along the tunnel path at 214. Subsequently the tunnel initiator enters the TCP Open state 195.

If during the authorized state 203, a local user issues an End Session command at 204, or there is a detection of an authentication or cryptography error in a received data frame at 205, the tunnel initiator enters the Close state 206. During the Close state 206 the tunnel initiator sends a CLOSE connection frame at 207 to the tunnel server. The tunnel initiator then enters the Dying state at 208.

Figure 14:
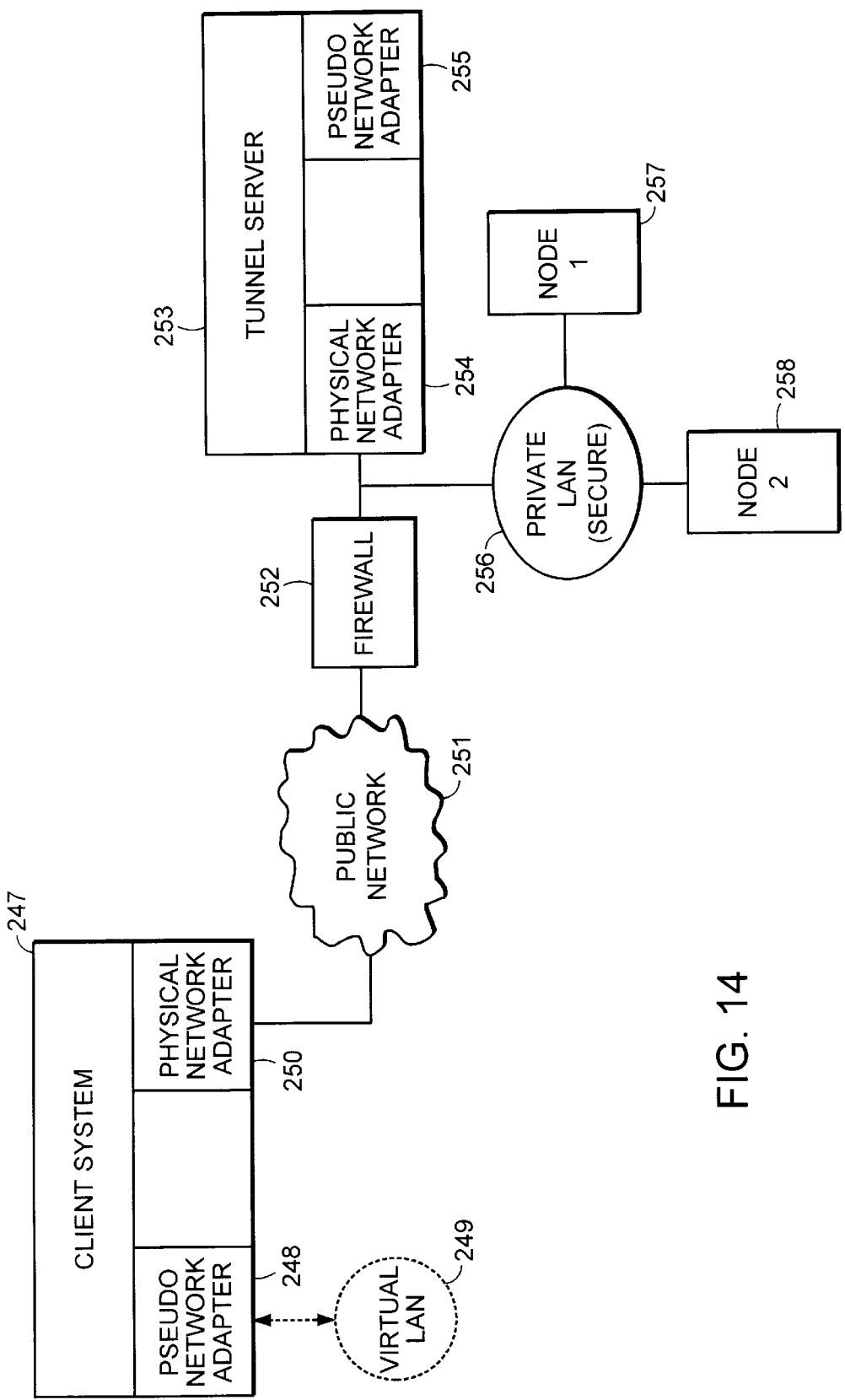
FIG. 14 is a block diagram showing an example embodiment of a tunnel connection between a client computer (tunnel client) and a server computer (tunnel server)

FIG. 12 is a state diagram showing the states within an example embodiment of a tunnel server, for example node D in FIG. 3 or tunnel server 253 in FIG. 14. The tunnel server begins in an Accept Wait state 217. In the Accept Wait state 217, the tunnel server receives a request for a reliable transport layer connection, for example a TCP connection request 218 from the last node in the tunnel path prior to the tunnel server, for example Node C in FIG. 3. In response to a TCP connection request 218 the tunnel server accepts the request and establishes a socket interface associated with the resulting TCP connection with Node C.

Upon establishment of the TCP connection with the last node in the tunnel path prior to the tunnel server, the tunnel server enters the Receive Relay state 219. In the Receive Relay state 219, the tunnel server waits to receive a relay frame at 220, at which time the tunnel server enters the Connect Wait state 221. If there is some sort of network error 234 during receipt of the relay frame at 219, the tunnel server enters the Dying state 230. During the Dying state 230 the tunnel server disconnects at 231 the transport layer connection with the last node in the tunnel path prior to the tunnel server. After disconnecting the connection, the tunnel server enters the Dead state 232.

In the Connect Wait state 221, the tunnel server waits for receipt of a key exchange/authentication REQUEST frame at 222. Following receipt of the key exchange/authentication REQUEST frame at 222, the tunnel server determines whether the requested tunnel connection is authorized at step 223. The determination of whether the tunnel connection is authorized is based on a name of the tunnel initiator, and the key exchange material within the key exchange/authentication REQUEST frame.

If the requested tunnel connection is authorized the tunnel server sends a key exchange/authentication RESPONSE frame at 224 back to the tunnel initiator. If the requested tunnel connection is not authorized, the tunnel server enters the Close state 228, in which it sends a close connection frame at 229 to the tunnel client. Following transmission of the CLOSE connection frame at 229, the tunnel server enters the Dying state 230.

If the requested tunnel connection is determined to be authorized at step 223, the tunnel server enters the Authorized state 225. In the Authorized state, the tunnel server transmits and receives tunnel data frames between itself and the tunnel initiator. If during the Authorized state 225, the tunnel server receives a CLOSE connection frame at 233, the tunnel server transitions to the Dying state 230. If during the authorized state 225, the tunnel server receives an end session command from a user at 226, then the tunnel server transitions to the Close state 228, and transmits a close connection frame at 229 to the tunnel initiator. If the tunnel server in the Authorized state 225 detects an integrity failure in a received packet, the tunnel server transitions to the Close state 228. In the close state 228 the tunnel server sends a CLOSE connection frame at 229 and subsequently enters the Dying state 230.

FIG. 13 is a state diagram showing an example embodiment of a state machine within a tunnel relay node. The tunnel relay node begins in an Accept Wait state 235. When a request is received to form a reliable transport layer connection at 236, a reliable transport layer connection is accepted with the requesting node. For example, a TCP connection is accepted between the relay node and the preceding node in the tunnel path.

The relay node then transitions to the Receive Relay state 237. During the Receive Relay state 237, the relay node receives a relay frame at 238. Following receipt of the relay frame at 238, the relay node determines what forwarding address should be used to forward frames received from the TCP connection established responsive to the TCP connect event 236. If the next node in the tunnel path is a tunnel server, the forwarding address may be selected at 239 so as to choose an underutilized tunnel server from a group of available tunnel servers or to choose an operational server where others are not operational.

Following determination of the forwarding address or addresses in step 239, the relay node enters the Forward Connect state 240. In the Forward Connect state 240, the relay node establishes a reliable transport layer connection with the node or nodes indicated by the forwarding address or addresses determined in step 239.

Following establishment of the new connection at event 241, the tunnel relay enters the Forward state 242. During the Forward state 242, the relay node forwards all frames between the connection established at 236 and those connections established at 241. Upon detection of a network error or receipt of a frame indicating a closure of the tunnel connection at 243, the tunnel relay enters the Dying state 244. Following the Dying state 244, the relay node disconnects any connections established at event 241. The relay node then enters the Dead state 246.

FIG. 14 shows an example embodiment of a virtual private network 249 formed by a pseudo network adapter 248 and a tunnel connection between a tunnel client 247 and a tunnel server 253 across a public network 251. The tunnel server 253 and tunnel client 247 are for example network stations including a CPU or microprocessor, memory, and various I/O devices. The tunnel server 253 is shown physically connected to a private LAN 256 including a Network Node 1 257 and a Network Node 2 258, through a physical network adapter 254. The tunnel server 253 is further shown physically connected with a firewall 252 which separates the private LAN 256 from the public network 251. The firewall 252 is physically connected with the public network 251. The tunnel server 253 is further shown including a pseudo network adapter 255. The client system 247 is shown including a physical network adapter 250 physically connected to the public network 251.

During operation of the elements shown in FIG. 14, nodes within the virtual private network 249 appear to the tunnel client 247 as if they were physically connected to the client system through the pseudo network adapter 248. Data transmissions between the tunnel client and any nodes that appear to be within the virtual private network are passed through the pseudo network adapter 248. Data transmissions between the tunnel client 247 and the tunnel server 253 are physically accomplished using a tunnel connection between the tunnel client 247 and the tunnel server 253.

Figure 15:
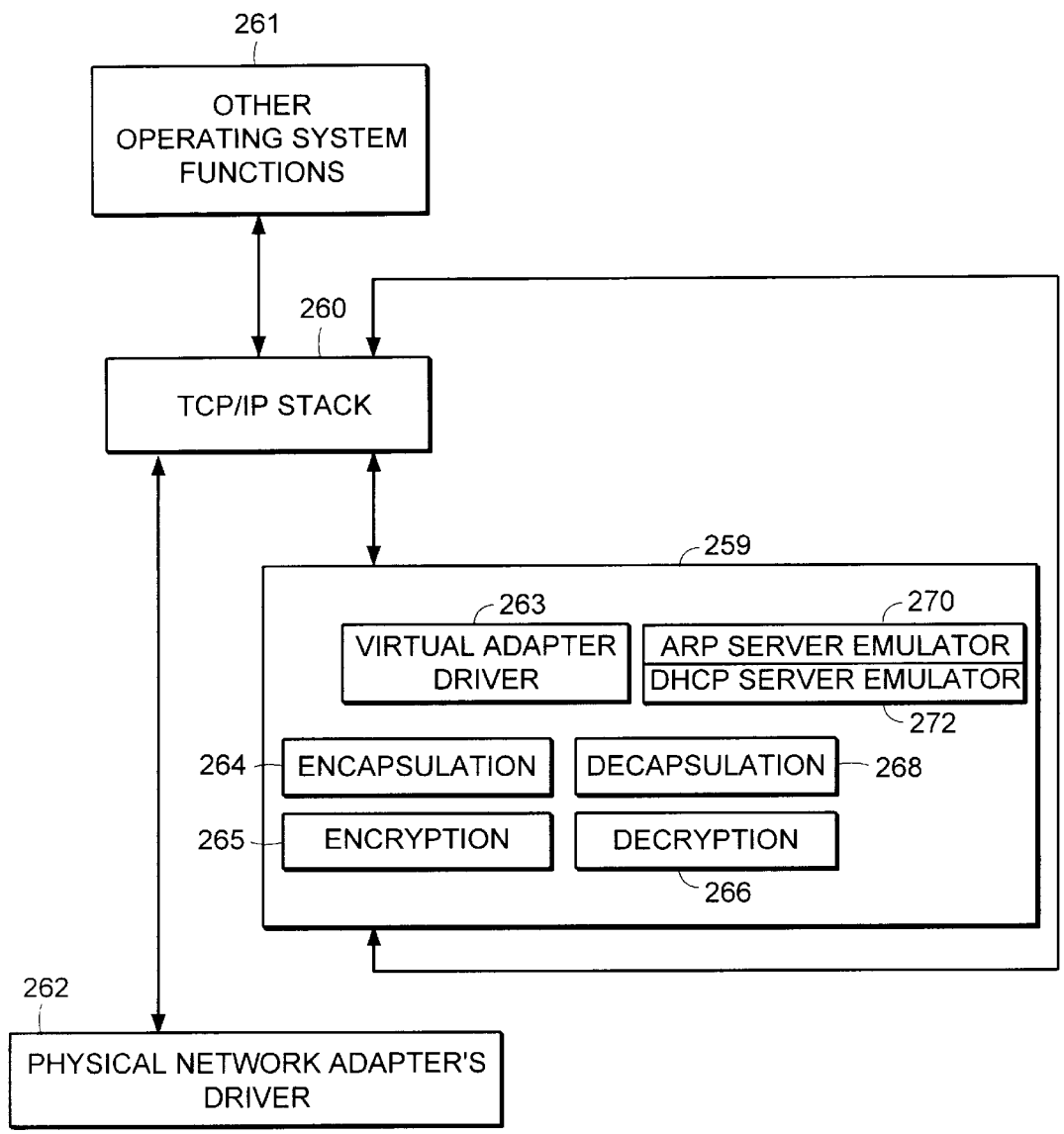
FIG. 15 is a block diagram showing an example embodiment of a pseudo network adapter.

FIG. 15 shows elements in an example embodiment of a pseudo network adapter such as the pseudo network adapter 248 in FIG. 14. In an example embodiment the elements shown in FIG. 15 are implemented as software executing on the tunnel client 247 as shown in FIG. 14. In FIG. 15 there is shown a pseudo network adapter 259 including a virtual adapter driver interface 263, an encapsulation engine 264, an encryption engine 265, a decapsulation engine 268, and a decryption engine 266. Further shown in the pseudo network adapter 259 are an ARP server emulator 270 and a Dynamic Host Configuration Protocol (DHCP) server emulator.

The pseudo network adapter 259 is shown interfaced to a TCP/IP protocol stack 260, through the virtual adapter driver interface 260. The TCP/IP protocol stack 260 is shown interfaced to other services in an operating system 261, as well as a physical network adapter's driver 262. The physical network adapter's driver 262 is for example a device driver which controls the operation of a physical network adapter such as physical network adapter 250 as shown in FIG. 14.

During operation of the elements shown in FIG. 15, the pseudo network adapter 259 registers with the network layer in the TCP/IP stack 260 that it is able to reach the IP addresses of nodes within the virtual private network 249 as shown in FIG. 14. For example, the pseudo network adapter on the client system registers that it can reach the pseudo network adapter on the server. Subsequently, a message from the tunnel client addressed to a node reachable through the virtual private network will be passed by the TCP/IP stack to the pseudo network adapter 259. The pseudo network adapter 259 then encrypts the message, and encapsulates the message into a tunnel data frame. The pseudo network adapter 259 then passes the tunnel data frame back to the TCP/IP protocol stack 260 to be sent through to the physical network adapter in the tunnel server. The tunnel server passes the received data frame to the pseudo network adapter in the server, which de-encapsulates and decrypts the message.

Figure 16:
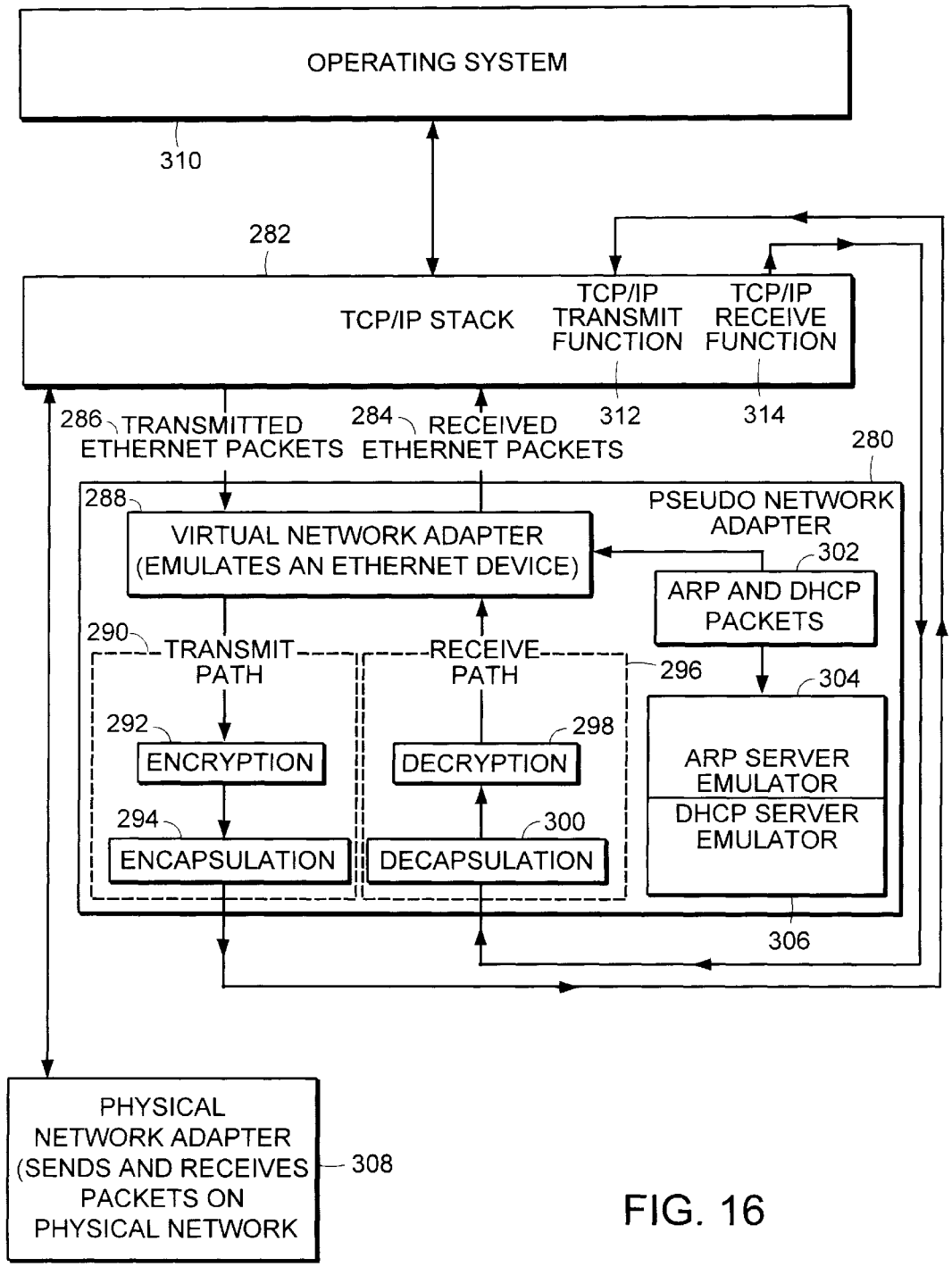
FIG. 16 is a block diagram showing an example embodiment of a pseudo network adapter.

FIG. 16 shows a more detailed example embodiment of a pseudo network adapter 280. The pseudo network adapter 280 includes a virtual network adapter driver interface 288. The transmit path 290 includes an encryption engine 292, and an encapsulation engine 294. The encapsulation engine 294 is interfaced with a TCP/IP transmit interface 312 within a TCP/IP protocol stack, for example a socket interface associated with the first relay node in the tunnel path, or with the remote tunnel end point if the tunnel path includes no relays.

In the example embodiment of FIG. 16, the pseudo network adapter 280 appears to the TCP/IP protocol stack 282 as an Ethernet adapter. Accordingly, ethernet packets 286 for a destination addresses understood by the TCP/IP protocol stack to be reachable through the virtual private network are passed from the TCP/IP protocol stack 282 to the virtual network adapter interface 288 and through the transmit path 290. Similarly, ethernet packets 284 received through the pseudo network adapter 280 are passed from the receive path 296 to the virtual network adapter interface 288 and on to the TCP/IP protocol stack 282.

Further shown in the pseudo network adapter 280 of FIG. 16 is a receive path 296 having a decryption engine 298 interfaced to the virtual network adapter interface 288 and a decapsulation engine 300. The decapsulation engine 300 in turn is interfaced to a TCP/IP receive function 314 in the TCP/IP protocol stack 282, for example a socket interface associated with the first relay in the tunnel path, or with the remote tunnel end point if the tunnel path includes no relays. The pseudo network adapter 280 further includes an ARP server emulator 304 and a DHCP server emulator 306. ARP and DHCP request packets 302 are passed to the ARP server emulator 304 and DHCP server emulator 306 respectively. When a received packet is passed from the receive path 296 to the TCP/IP stack 282, a receive event must be indicated to the TCP/IP stack 282, for example through an interface such the Network Device Interface Specification (NDIS), defined by Microsoft™ Corporation.

Also in FIG. 16 is shown is an operating system 310 coupled with the TCP/IP protocol stack 282. The TCP/IP protocol stack 282 is generally considered to be a component part of the operating system. The operating system 310 in FIG. 16 is accordingly the remaining operating system functions and procedures outside the TCP/IP protocol stack 282. A physical network adapter 308 is further shown operated by the TCP/IP protocol stack 282.

During operation of the elements shown in FIG. 16, a user passes data for transmission to the TCP/IP protocol stack 282, and indicates the IP address of the node to which the message is to be transmitted, for example through a sock et interface to the TCP layer. The TCP/IP protocol stack 282 then determines whether the destination node is reachable through the virtual private network. If the message is for a node that is reachable through the virtual private network, the TCP/IP protocol stack 282 an ethernet packet 286 corresponding to the message to the pseudo network adapter 280. The pseudo network adapter 280 then passes the ethernet packet 286 through the transmit path, in which the ethernet packet is encrypted and encapsulated into a tunnel data frame. The tunnel data frame is passed back into the TCP/IP protocol stack 282 through the TCP/IP transmit function 312 to be transmitted to the tunnel server through the tunnel connection. In an example embodiment, a digest value is calculated for the tunnel data frame before encryption within the transmit path within the pseudo network adapter.

Further during operation of the elements shown in FIG. 16, when the TCP/IP protocol stack 282 receives a packet from the remote endpoint of the TCP/IP tunnel connection, for example the tunnel server, the packet is passed to the pseudo network adapter 280 responsive to a TCP receive event. The pseudo network adapter 280 then decapsulates the packet by removing the tunnel header. The pseudo network adapter further decrypts the decapsulated data and passes it back to the TCP/IP protocol stack 282. The data passed from the pseudo network adapter 280 appears to the TCP/IP protocol stack 282 as an ethernet packet received from an actual physical device, and is the data it contains is passed on to the appropriate user by the TCP/IP protocol stack 282 based on information in the ethernet packet header provided by the pseudo network adapter.

Figure 17:
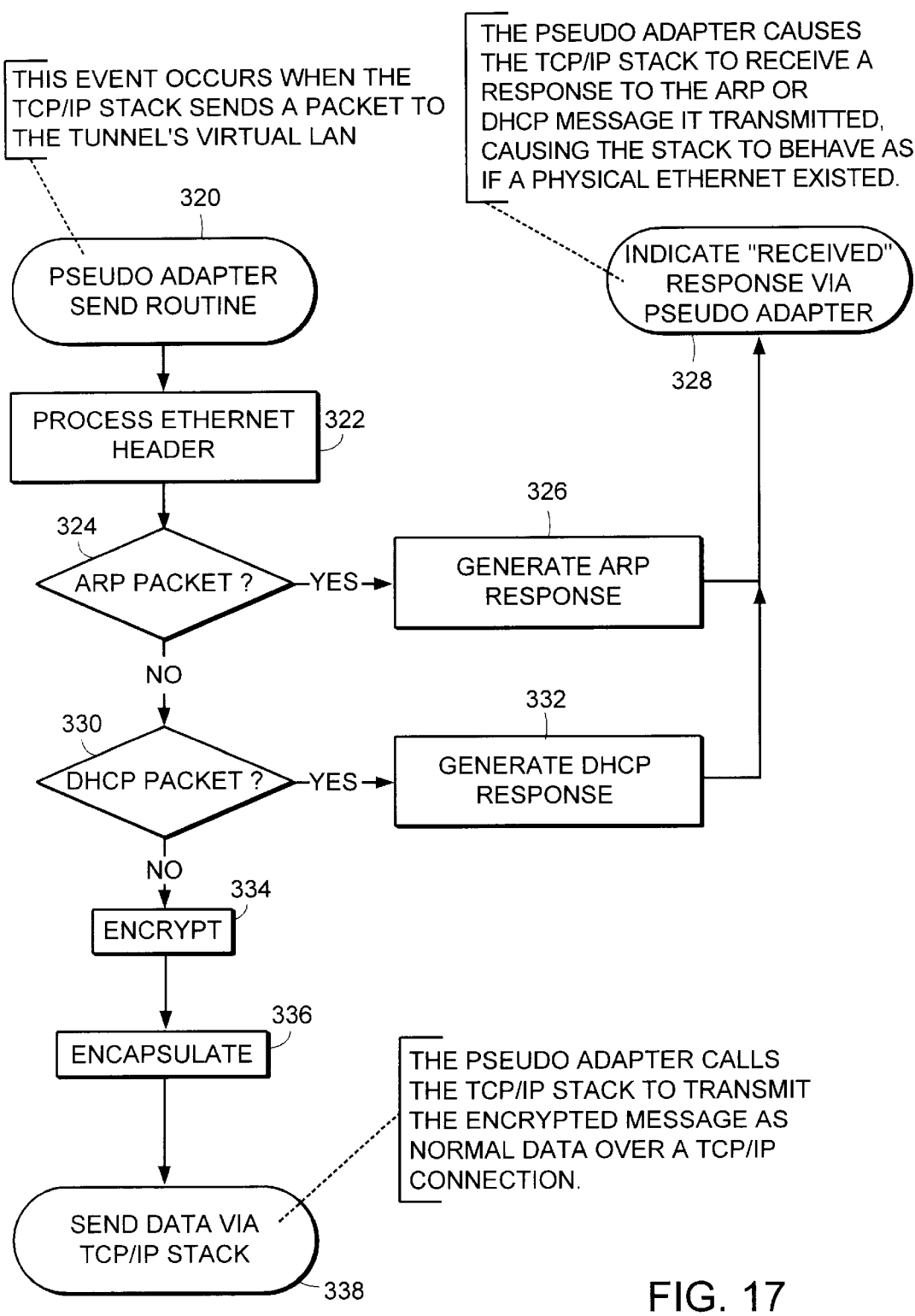
FIG. 17 is a flow chart showing steps performed by an example embodiment of a pseudo network adapter during packet transmission.

FIG. 17 is a flow chart showing steps performed by an example embodiment of a pseudo network adapter during packet transmission, such as in the transmit path 290 of FIG. 14. The TCP/IP protocol stack determines that the destination node of a packet to be transmitted is reachable through the virtual LAN based on the destination IP address of the packet and a network layer routing table. At step 320 the packet is passed to the pseudo network adapter from the TCP/IP protocol stack. As a result, a send routine in the pseudo adapter is triggered for example in the virtual network adapter interface 288 of FIG. 16.

At step 322 the pseudo network adapter send routine processes the Ethernet header of the packet provided by the TCP/IP stack, and removes it. At step 324, the send routine determines whether the packet is an ARP request packet. If the packet is an ARP request packet for an IP address of a node on the virtual LAN, such as the pseudo network adapter of the tunnel server, then step 324 is followed by step 326. Otherwise, step 324 is followed by step 330.

At step 326, the ARP server emulator in the pseudo network adapter generates an ARP reply packet. For example, if the ARP request were for a physical address corresponding to the IP address of the pseudo network adapter on the tunnel server, the ARP reply would indicate a predetermined, reserved physical address to be associated with that IP address. At step 328 the pseudo network adapter passes the ARP response to the virtual network adapter interface. The virtual network adapter interface then indicates a received packet to the TCP/IP protocol stack, for example using an NDIS interface. The TCP/IP protocol stack then processes the ARP response as if it had been received over an actual physical network.

At step 330 the send routine determines whether the packet is a DHCP request packet requesting an IP address for the pseudo network adapter. If so, then step 330 is followed by step 332. Otherwise, step 330 is followed by step 334.

At step 334, the DHCP server emulator in the pseudo network adapter generates a DHCP response. The format of DHCP is generally described in the DHCP RFC. At step 328 the pseudo network adapter passes the DHCP response to the virtual network adapter interface, for example indicating an IP address received from the tunnel server in the client data field of the key exchange/authentication RESPONSE frame. The virtual network adapter interface then indicates a received packet to the TCP/IP protocol stack. The TCP/IP protocol stack then processes the DHCP response as if it had been received over an actual physical network.

At step 334 the pseudo network adapter encrypts the message using an encryption engine such that only the receiver is capable of decrypting and reading the message. At step 336 the pseudo network adapter encapsulates the encrypted message into a tunnel data frame. At step 338 the pseudo network adapter transmits the tunnel data frame through the tunnel connection using the TCP/IP protocol stack.

Figure 18:
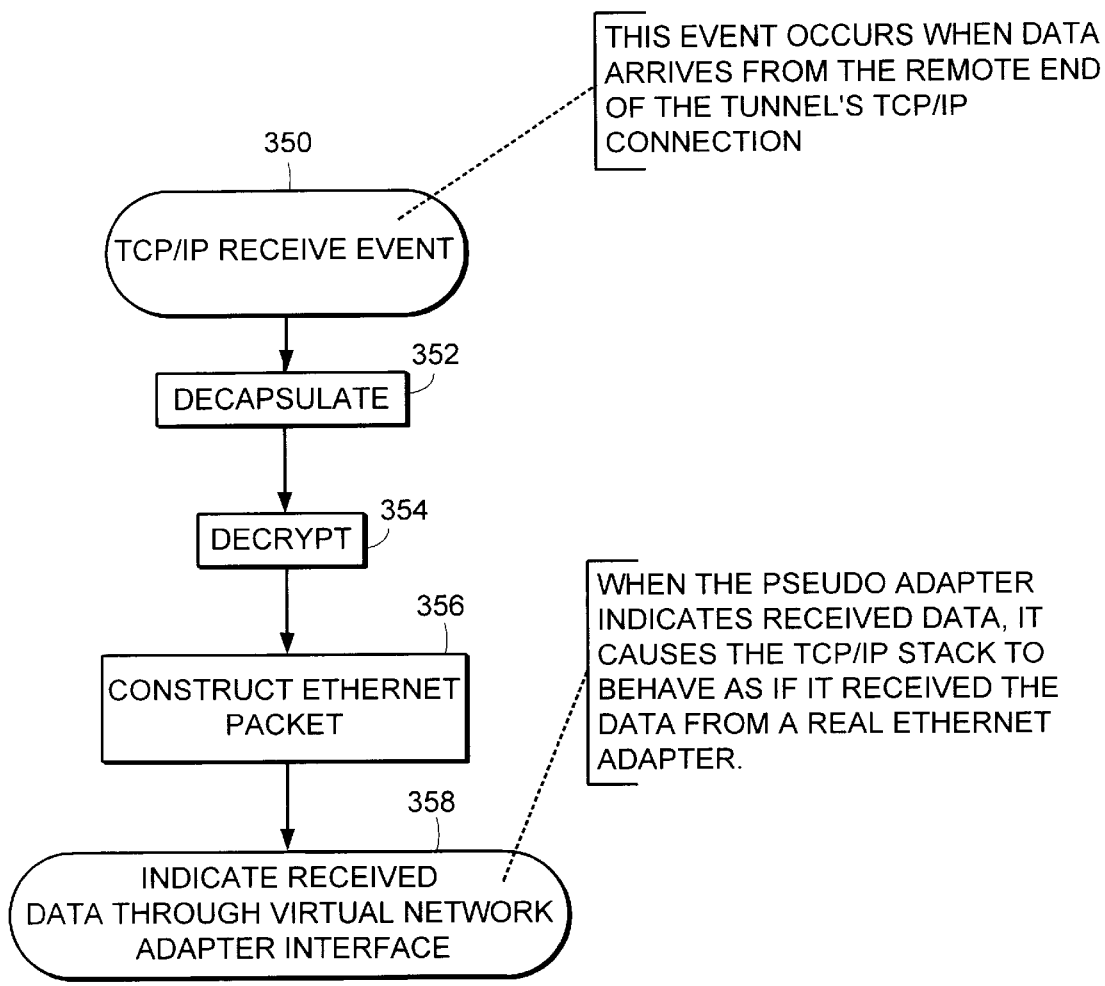
FIG. 18 is a flow chart showing steps performed by an example embodiment of a pseudo network adapter during packet receipt.

FIG. 18 is a flow chart showing steps performed by an example embodiment of a pseudo network adapter during packet receipt, such as in the receive path 296 of FIG. 14. At step 350, the pseudo network adapter is notified that a packet has been received over the tunnel connection. At step 352 the pseudo network adapter decapsulates the received message by removing the header fields of the tunnel data frame. At step 354 the pseudo network adapter decrypts the decapsulated datagram from the tunnel data frame. At step 356, in an example embodiment, the pseudo network adapter forms an Ethernet packet from the decapsulated message. At step 358 the pseudo network adapter indicates that an Ethernet packet has been received to the TCP/IP protocol stack through the virtual network adapter interface. This causes the TCP/IP protocol stack to behave as if it had received an Ethernet packet from an actual Ethernet adapter.

Figure 19:
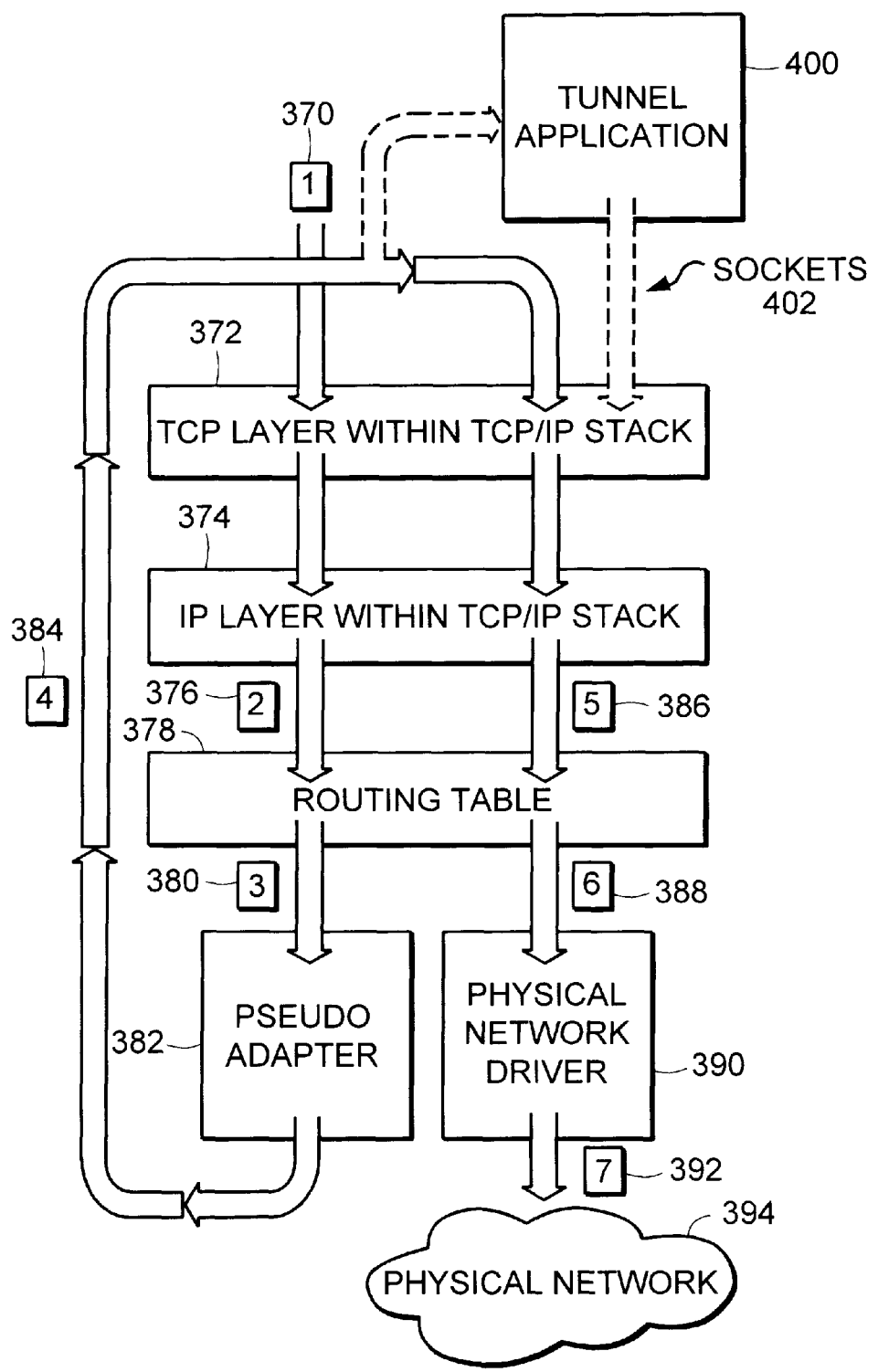
FIG. 19 is a data flow diagram showing data flow in an example embodiment of a pseudo network adapter during packet transmission.

FIG. 19 shows the data flow within the transmit path in an example embodiment of a pseudo network adapter. At step 1 370, an application submits data to be transmitted to the TCP protocol layer 372 within the TCP/IP protocol stack. The application uses a conventional socket interface to the TCP protocol layer 372 to pass the data, and indicates the destination IP address the data is to be transmitted to. The TCP protocol layer 372 then passes the data to the IP protocol layer 374 within the TCP/IP protocol stack. At step 2 376, the TCP/IP protocol stack refers to the routing table 378 to determine which network interface should be used to reach the destination IP address.

Because in the example the destination IP address is of a node reachable through the virtual private network, the IP layer 374 determines from the routing table 378 that the destination IP address is reachable through pseudo network adapter. Accordingly at step 3 380 the TCP/IP protocol stack passes a packet containing the data to the pseudo network adapter 382.

At step 4 384, the pseudo network adapter 382 encrypts the data packets and encapsulates them into tunnel data frames. The pseudo network adapter 382 then passes the tunnel data frames packets back to the TCP protocol layer 372 within the TCP/IP protocol stack through a conventional socket interface to the tunnel connection with the first node in the tunnel path.

The TCP protocol layer 372 then forms a TCP layer packet for each tunnel data frame, having the tunnel data frame as its data. The TCP frames are passed to the IP layer 374. At step 5 386 the routing table 378 is again searched, and this time the destination IP address is the IP address associated with the physical network adapter on the tunnel server, and accordingly is determined to be reachable over the physical network adapter 390. Accordingly at step 6 388 the device driver 390 for the physical network adapter is called to pass the packets to the physical network adapter. At step 7 392 the physical network adapter transmits the data onto the physical network 394.

Figure 20:
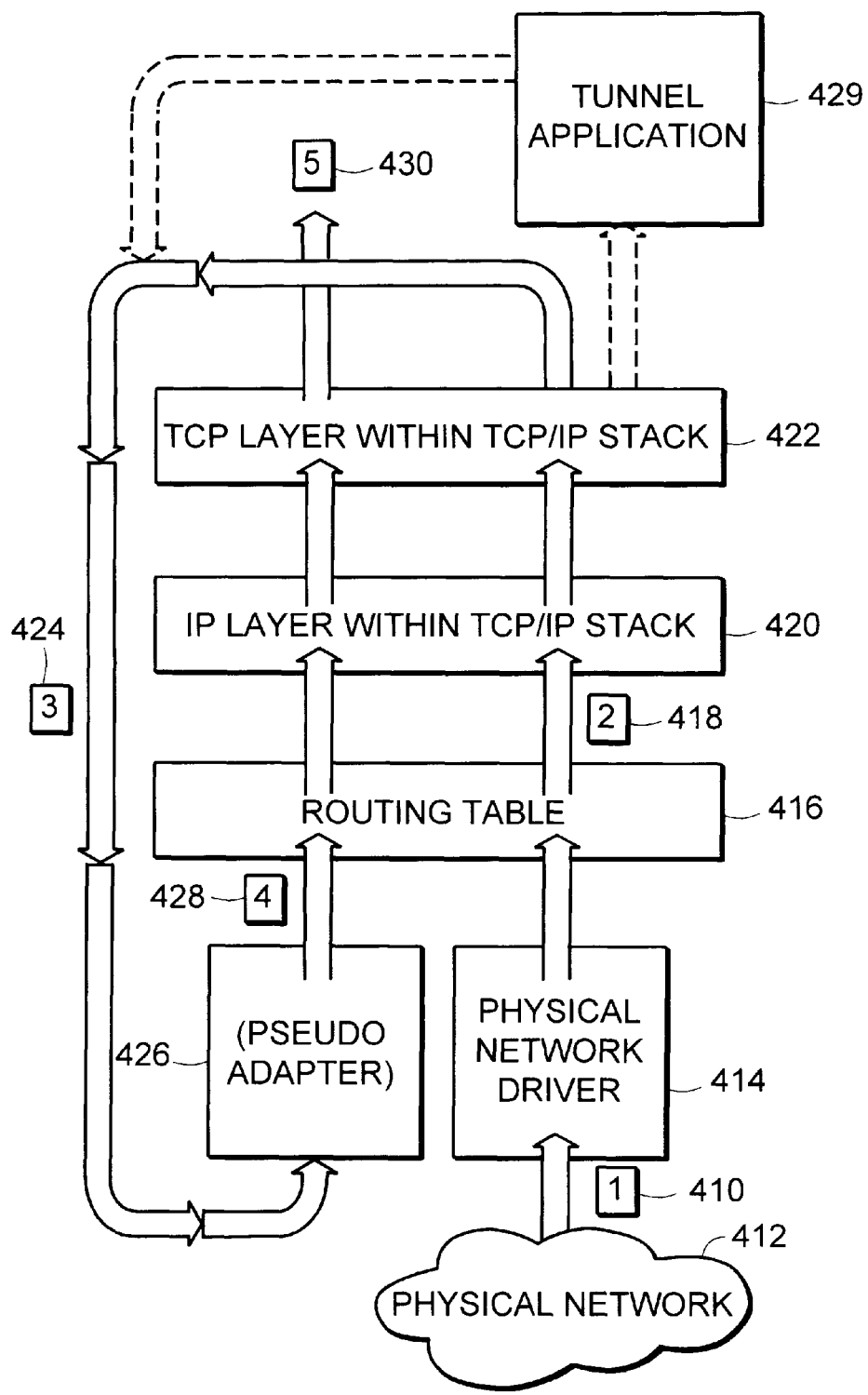
FIG. 20 is a data flow diagram showing data flow in an example embodiment of a pseudo network adapter during packet receipt.

FIG. 20 is a data flow diagram showing data flow in an example embodiment of packet receipt involving a pseudo network adapter. At step 1 410 data arrives over the physical network 412 and is received by the physical network adapter and passed to the physical network driver 414. The physical network driver 414 passes the data at step 2 418 through the IP layer 420 and TCP layer 422 to the pseudo network adapter 426 at step 3 424, for example through a conventional socket interface. At step 4 428 the pseudo network adapter 426 decrypts and decapsulates the received data and passes it back to the IP layer of the TCP/IP protocol stack, for example through the TDI (Transport Layer Dependent Interface API) of the TCP/IP stack. The data is then passed through the TCP/IP protocol stack and to the user associated with the destination IP address in the decapsulated datagrams at step 5 430.

Figure 21:
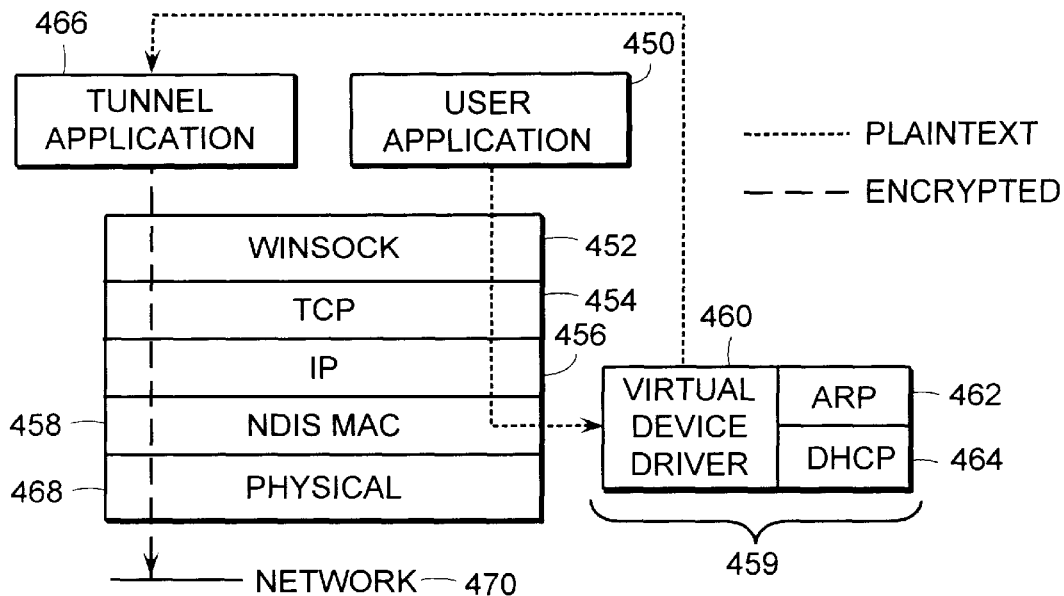
FIG. 21 is a diagram showing the movement of encrypted and unencrypted data in an example embodiment of a system including a pseudo network adapter.

FIG. 21 shows data flow in an example embodiment of packet transmission involving a pseudo network adapter. FIG. 21 shows an example embodiment for use on a Microsoft™ Windows 95™ PC platform. In FIG. 21 a user application 450 passes unencrypted data to an interface into the TCP layer of the TCP/IP protocol, for example the WinSock API 452. The user indicates a destination IP address associated with a node reachable through a virtual private network accessible through the pseudo network adapter.

The TCP layer 454 passes the data to the IP layer 456, which in turn passes the data to the Network Device Interface Specification Media Access Control (NDIS MAC) interface 458. The pseudo network adapter 459 has previously registered with the routing layer (IP) that it is able to reach a gateway address associated with the destination IP address for the user data. Accordingly the IP layer uses the NDIS MAC layer interface to invoke the virtual device driver interface 460 to the pseudo network adapter 459. The pseudo network adapter 459 includes a virtual device driver interface 460, an ARP server emulator 462, and a DHCP server emulator 464.

In the example embodiment of FIG. 19, the pseudo network adapter 459 passes the data to a tunnel application program 466. The tunnel application program 466 encrypts the IP packet received from the IP layer and encapsulates it into a tunnel data frame. The tunnel application then passes the tunnel data frame including the encrypted data to the WinSock interface 452, indicating a destination IP address of the remote tunnel end point. The tunnel data frame is then passed through the TCP layer 454, IP layer 456, NDIS MAC layer interface 458, and physical layer 468, and transmitted on the network 470. Since the resulting packets do not contain a destination IP address which the pseudo network adapter has registered to convey, these packets will not be diverted to the pseudo network adapter.

Figure 22:
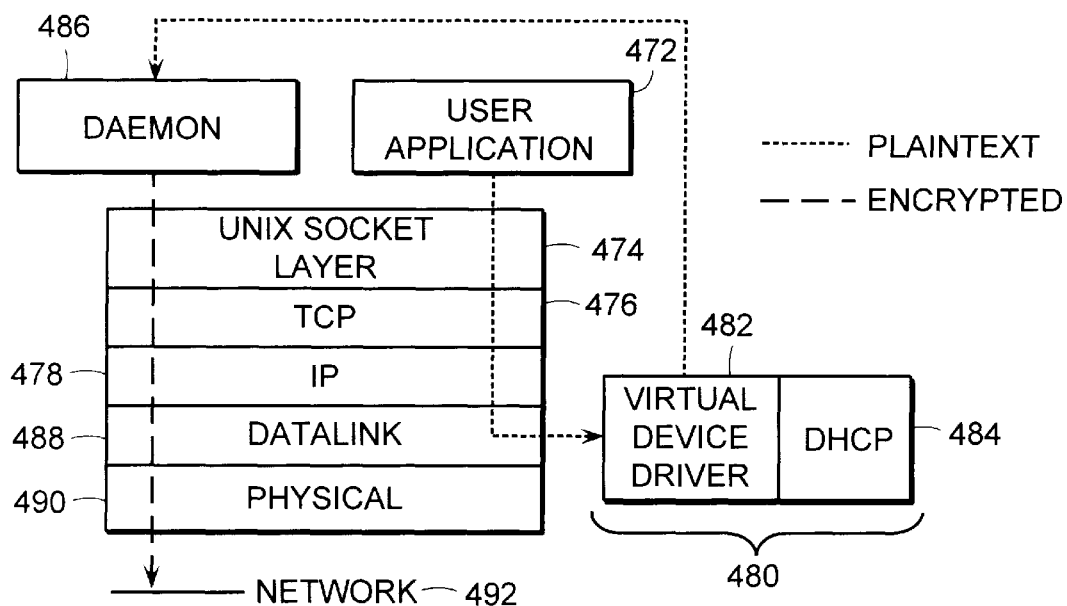
FIG. 22 is a diagram showing the movement of encrypted and unencrypted data in an example embodiment of a system including a pseudo network adapter.

FIG. 22 is a data flow diagram showing data flow in an example embodiment of packet transmission involving a pseudo network adapter. The embodiment shown in FIG. 22 is for use on a UNIX platform. In FIG. 20 a user application 472 passes unencrypted data to a socket interface to the TCP/IP protocol stack in the UNIX socket layer 474, indicating a destination IP address of a node reachable through the virtual private network.

The UNIX socket layer 474 passes the data through the TCP layer 476 and the IP layer 478. The pseudo network adapter 480 has previously registered with the routing layer (IP) that it is able to reach a gateway associated with the destination IP address for the user data. Accordingly the IP layer 478 invokes the virtual device driver interface 482 to the pseudo network adapter 480. The IP layer 478 passes the data to the pseudo network adapter 480. The pseudo network adapter 480 includes a virtual device driver interface 482, and a DHCP server emulator 484.

In the example embodiment of FIG. 22, the pseudo network adapter 480 passes IP datagrams to be transmitted to a UNIX Daemon 486 associated with the tunnel connection. The UNIX Daemon 486 encrypts the IP packet(s) received from the IP layer 478 and encapsulates them into tunnel data frames. The UNIX daemon 486 then passes the tunnel data frames to the UNIX socket layer 474, through a socket associated with the tunnel connection. The tunnel data frames are then processed by the TCP layer 476, IP layer 478, data link layer 488, and physical layer 490 to be transmitted on the network 492. Since the resulting packets are not addressed to an IP address which the pseudo network adapter 480 has registered to convey, the packets will not be diverted to the pseudo network adapter 480.

Figure 23:
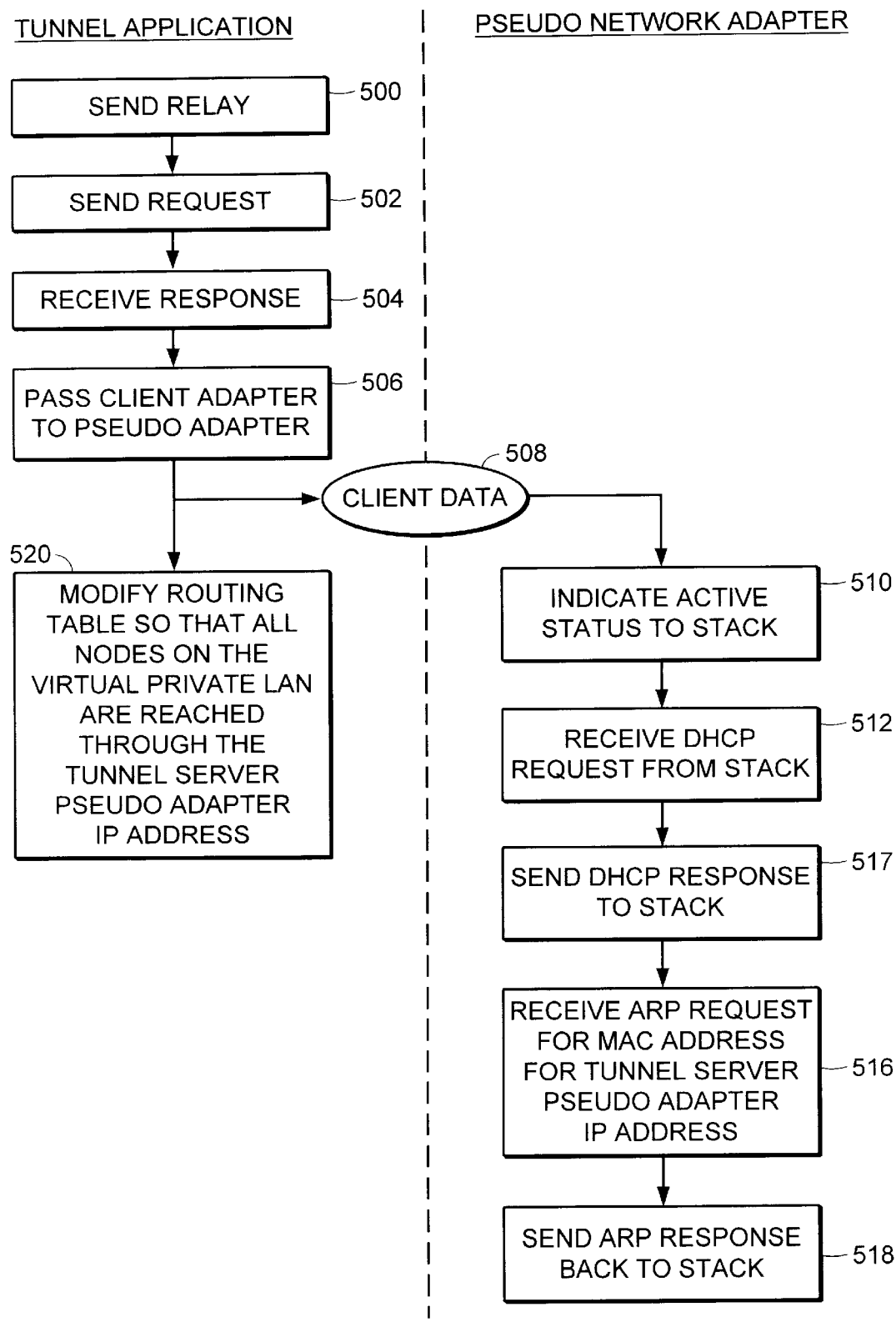
FIG. 23 is a flow chart showing steps initialization of an example embodiment of a system including a pseudo network adapter.

FIG. 23 is a flow chart showing steps to initialize a example embodiment of a virtual private network. The steps shown in FIG. 23 are performed for example in the tunnel client 247 as shown in FIG. 14. At step 500 a tunnel application program executing in the tunnel client sends a tunnel relay frame to the tunnel server. At step 502 the tunnel application program sends a tunnel key exchange/authentication REQUEST frame to the tunnel server. The tunnel application in the tunnel server ignores the contents of the client data field in the tunnel key exchange/authentication REQUEST frame. The tunnel application in the tunnel server fills in the client data field in the tunnel key exchange/authentication RESPONSE frame with Dynamic Host Configuration Protocol (DHCP) information, for example including the following information in standard DHCP format:

1) IP Address for tunnel client Pseudo Network Adapter
2) IP Address for tunnel server Pseudo Network Adapter
3) Routes to nodes on the private network physically connected to the tunnel server which are to be reachable over the tunnel connection.

At step 504 the tunnel application receives a tunnel key exchange/authentication RESPONSE frame from the tunnel server. The client data field 508 in the tunnel connection response is made available to the pseudo network adapter in the tunnel client. The tunnel application in the tunnel client tells the TCP/IP stack that the pseudo network adapter in the tunnel client is active. The pseudo network adapter in the tunnel client is active and ready to be initialized at step 510.

The tunnel client system is configured such that it must obtain an IP address for the tunnel client pseudo network adapter dynamically. Therefore the TCP/IP stack in the tunnel client broadcasts a DHCP request packet through the pseudo network adapter. Accordingly, at step 512 the pseudo network adapter in the client receives a conventional DHCP request packet from the TCP/IP stack requesting a dynamically allocated IP address to associate with the pseudo network adapter. The pseudo network adapter passes the DHCP request packet to the DHCP server emulator within the pseudo network adapter, which forms a DHCP response based on the client data 508 received from the tunnel application. The DHCP response includes the IP address for the client pseudo adapter provided by the tunnel server in the client data. At step 514 the pseudo network adapter passes the DHCP response to the TCP/IP stack.

At step 520, the tunnel application modifies the routing tables within the tunnel client TCP/IP stack to indicate that the routes to the nodes attached to the private network to which the tunnel server is attached all are reachable only through the pseudo network adapter in the tunnel server. The IP address of the pseudo network adapter in the tunnel server provided in the client data is in this way specified as a gateway to the nodes on the private network to which the tunnel server is attached. In this way those remote nodes are viewed by the TCP/IP stack as being reachable via the virtual private network through the client pseudo network adapter.

At step 516 the pseudo network adapter in the tunnel client receives an ARP request for a physical address associated with the IP address of the pseudo network adapter in the tunnel server. The pseudo network adapter passes the ARP request to the ARP server emulator, which forms an ARP reply indicating a reserved physical address to be associated with the IP address of the pseudo network adapter in the tunnel server. At step 518 the pseudo network adapter passes the ARP response to the TCP/IP stack in the tunnel client. In response to the ARP response, the TCP/IP stack determines that packets addressed to any node on the virtual private network must be initially transmitted through the pseudo network adapter.

In an example embodiment the present system reserves two physical addresses to be associated with the pseudo network adapter in the client and the pseudo network adapter in the server respectively. These reserved physical addresses are used in responses to ARP requests passed through the pseudo network adapter for physical addresses corresponding to the IP addresses for the pseudo network adapter in the client and the pseudo network adapter in the server respectively. The reserved physical addresses should have a high likelihood of not being used in any actual network interface.

While the invention has been described with reference to specific example embodiments, the description is not meant to be construed in a limiting sense. Various modifications of the disclosed embodiments, as well as other embodiments of the invention, will be apparent to persons skilled in the art upon reference to this description. Specifically, while various embodiments have been described using the TCP/IP protocol stack, the invention may advantageously be applied where other communications protocols are used. Also, while various flow charts have shown steps performed in an example order, various implementations may use altered orders of step in order to apply the invention. And further, while certain specific software and/or hardware platforms have been used in the description, the invention may be applied on other platforms with similar advantage. It is therefore contemplated that the appended claims will cover any such modifications or embodiments which fall within the true scope of the invention.

What is claimed is:

1. A pseudo network adapter providing a virtual private network, comprising:

an interface for capturing packets from a local communications protocol stack for transmission on said virtual private network, said interface appearing to said local communications protocol stack as a network adapter device driver for a network adapter connected to said virtual private network;

a first server emulator, providing a first reply packet responsive to a first request packet captured by said interface for capturing packets from said local communications protocol stack for transmission on said virtual private network, said first request packet requesting a network layer address for said pseudo network adapter, said first reply indicating a network layer address for said pseudo network adapter; and a second server emulator, providing a second reply packet responsive to an second request packet captured by said interface for capturing packets from said local communications protocol stack for transmission on said virtual private network, said second request packet requesting a physical address corresponding to a network layer address of a second pseudo network adapter, said second pseudo network adapter located on a remote server node, said second reply indicating a predetermined, reserved physical address.

2. The pseudo network adapter of claim 1, further comprising a means for indicating to said local communications protocol stack that said predetermined, reserved physical address is reachable through said pseudo network adapter.

3. The pseudo network adapter of claim 2, wherein said means for indicating to said local communications protocol stack that said predetermined, reserved physical address is reachable through said pseudo network adapter modifies a data structure in said local communications protocol stack indicating which nodes or networks are reachable through each network interface of the local system.

4. The pseudo network adapter of claim 1, further comprising a means for indicating to said local communications protocol stack that one or more nodes on a remote private network connected to said remote server node are reachable through a gateway node equal to said second pseudo network adapter on said remote server node.

5. The pseudo network adapter of claim 4, wherein said means for indicating to said local communications protocol stack that one or more nodes on said remote private network connected to said remote server node are reachable through a gateway node equal to said second pseudo network adapter on said remote server node modifies a network layer routing table in said local communications protocol stack.

6. The pseudo network adapter of claim 1, further comprising:

a transmit path for processing data packets captured by said interface for capturing packets from said local communications protocol stack for transmission on said virtual private network;

an encryption engine, within said transmit path, for encrypting said data packets;

an encapsulation engine, within said transmit path, for encapsulating said encrypted data packets into tunnel data frames; and a means for passing said tunnel data frames back to said local communications protocol stack for transmission to a physical network adapter on said remote server node.

7. The pseudo network adapter of claim 6, wherein said transmit path further includes means for storing a digest value in a digest field in each of said tunnel data frames, said digest value equal to an output of a keyed hash function applied to said data packet encapsulated within said tunnel data frame concatenated with a counter value equal to a total number of tunnel data frames previously transmitted to said remote server node.

8. The pseudo network adapter of claim 6, wherein said transmit path further includes means for processing an Ethernet header in each one of said captured data packets, said processing of said Ethernet header including removing said Ethernet header.

9. The pseudo network adapter of claim 1, further comprising an interface into a transport layer of said local communications protocol stack for capturing received data packets from said remote server node.

10. The pseudo network adapter of claim 9, further comprising:

a receive path for processing received data packets captured by said interface into said transport layer of said local communications protocol stack for capturing received data packets from said remote server node;

an decapsulation engine, within said receive path, for decapsulating said received data packets by removing a tunnel frame header; and an decryption engine, within said receive path, for decrypting said received data packets;

a means for passing said received data packets back to said local communications protocol stack for delivery to a user.

11. The pseudo network adapter of claim 1, wherein said network layer address for said pseudo network adapter and said predetermined, reserved physical address is communicated to said pseudo network adapter from said remote server node as client data in a connection response frame.

12. A method for providing a pseudo network adapter for a virtual private network, comprising:

capturing packets from a local communications protocol stack for transmission on said virtual private network, said capturing through an interface appearing to said local communications stack as a network adapter device driver for a network adapter connected to said virtual private network;

issuing a first reply packet responsive to a first request packet captured by said interface for capturing packets from said local communications protocol stack for transmission on said virtual private network, said first request packet requesting a network layer address for said pseudo network adapter, said first reply indicating a network layer address for said pseudo network adapter; and issuing a second reply packet responsive to a second request packet captured by said interface for capturing packets from said local communications protocol stack for transmission on said virtual private network, said second request packet requesting a physical address corresponding to a network layer address of a second pseudo network adapter, said second pseudo network adapter located on a remote server node, said ARP Reply indicating a predetermined, reserved physical address.

13. The method of claim 12, further comprising indicating to said local communications protocol stack that said predetermined, reserved physical address is reachable through said pseudo network adapter.

14. The method of claim 13, wherein said step of indicating to said local communications protocol stack that said predetermined, reserved physical address is reachable through said pseudo network adapter modifies a data structure in said local communications protocol stack indicating which nodes or networks are reachable through each network interface of the local system.

15. The method of claim 12, further comprising indicating to said local communications protocol stack that one or more nodes on a remote private network connected to said remote server node are reachable through a gateway node equal to said second pseudo network adapter on said remote server node.

16. The method of claim 15, wherein said step of indicating to said local communications protocol stack that one or more nodes on said remote private network connected to said remote server node are reachable through a gateway node equal to said second pseudo network adapter on said remote server node modifies a network layer routing table in said local communications protocol stack.

17. The method of claim 12, further comprising:

processing data packets captured by said interface for capturing packets from said local communications protocol stack for transmission on said virtual private network in a transmit data path;

encrypting said data packets in an encryption engine, within said transmit path;

encapsulating said encrypted data packets into tunnel data frames by an encapsulation engine, within said transmit path; and passing said tunnel data frames back to said local communications protocol stack for transmission to a physical network adapter on said remote server node.

18. The method of claim 17, wherein said transmit path further includes storing a digest value in a digest field in each of said tunnel data frames, said digest value equal to an output of a keyed hash function applied to said data packet encapsulated within said tunnel data frame concatenated with a counter value equal to a total number of tunnel data frames previously transmitted to said remote server node.

19. The method of claim 17, wherein said transmit path further includes processing an Ethernet header in each one of said captured data packets, said processing of said Ethernet header including removing said Ethernet header.

20. The method of claim 12, further comprising capturing received data packets from said remote server node through an interface into a transport layer of said local communications protocol stack.

21. The method of claim 20, further comprising:

processing received data packets captured by said interface into said transport layer of said local communications protocol stack for capturing received data packets from said remote server node in a receive path;

decapsulating said received data packets by removing a tunnel frame header in an decapsulation engine, within said receive path; and decrypting said received data packets in a decryption engine within said receive path;

passing said received data frames packets back to said local communications protocol stack for delivery to a user.

22. The method of claim 12, wherein said network layer address for said pseudo network adapter and said predetermined, reserved physical address is communicated to said pseudo network adapter from said remote server node as client data in a connection response frame.

* * * * *

UNITED STATES PATENT AND TRADEMARK OFFICE
CERTIFICATE OF CORRECTION

PATENT NO.   : 6,101,543
DATED        : August 8, 2000
INVENTOR(S)  : Kenneth F. Alden et al.

It is certified that error appears in the above-identified patent and that said Letters Patent is hereby corrected as shown below:

Column 8,
Line 9, after "form" delete "a"

Column 9,
Line 54, delete "use" and insert therefor -- used --

Column 10,
Line 42, after "in" delete "the"
Line 49, delete the second occurrence of "an" and insert therefor -- a --

Column 11
Line 4, "previously" should begin a new line

Column 15,
Line 58, delete "sock et" and insert therefor -- socket --

Column 19,
Line 15, delete second occurrence of "a" and insert therefor -- an --

Column 20,
Line 64, delete "an" and insert therefor -- a --

Column 22,
Lines 1 and 4, delete "an" and insert therefor -- a --

UNITED STATES PATENT AND TRADEMARK OFFICE
CERTIFICATE OF CORRECTION

PATENT NO. : 6,101,543
DATED : August 8, 2000
INVENTOR(S) : Kenneth F. Alden et al.

It is certified that error appears in the above-identified patent and that said Letters Patent is hereby corrected as shown below:

<u>Column 24,</u>
Line 10, delete "an" and insert therefor -- a --

Signed and Sealed this

Twenty-first Day of June, 2005

JON W. DUDAS
*Director of the United States Patent and Trademark Office*